(12) United States Patent
Kashikar et al.

(10) Patent No.: US 7,732,047 B2
(45) Date of Patent: *Jun. 8, 2010

(54) FIBER SIZE, SIZED REINFORCEMENTS, AND ARTICLES REINFORCED WITH SIZED REINFORCEMENTS

(75) Inventors: Sanjay Kashikar, Kelmis (BE); Jean-Marc Henrion, Theux (BE); Les E. Campbell, Anderson, SC (US)

(73) Assignee: OCV Intellectual Capital, LLC DE (US)

(*) Notice: Subject to any disclaimer, the term of this patent is extended or adjusted under 35 U.S.C. 154(b) by 417 days.

This patent is subject to a terminal disclaimer.

(21) Appl. No.: 11/296,040

(22) Filed: Dec. 7, 2005

(65) Prior Publication Data

US 2006/0083922 A1 Apr. 20, 2006

Related U.S. Application Data

(63) Continuation-in-part of application No. 10/982,462, filed on Nov. 5, 2004, now Pat. No. 7,585,563, and a continuation-in-part of application No. 09/847,009, filed on May 1, 2001, now Pat. No. 6,846,855.

(51) Int. Cl.
 C08K 9/06 (2006.01)
 B32B 9/00 (2006.01)
(52) U.S. Cl. ............... 428/392; 428/375; 428/378; 428/391; 428/292.1; 523/213; 523/214; 524/321; 524/492; 524/504
(58) Field of Classification Search ............ None
 See application file for complete search history.

(56) References Cited

U.S. PATENT DOCUMENTS

| | | |
|---|---|---|
| 3,416,990 A | 12/1968 | Robinson, Jr. |
| 3,437,550 A | 4/1969 | Paul, Jr. |
| 3,655,353 A | 4/1972 | Nalley et al. |
| 3,928,687 A | 12/1975 | Wada et al. |
| 4,240,944 A * | 12/1980 | Temple ............ 524/188 |
| 4,243,481 A * | 1/1981 | Dumas ............ 162/158 |
| 4,283,322 A * | 8/1981 | Temple ............ 524/522 |
| 4,394,418 A | 7/1983 | Temple |
| 4,483,948 A | 11/1984 | Tamosauskas |
| 5,176,956 A | 1/1993 | Jevne et al. |
| 5,221,285 A | 6/1993 | Andrews et al. |
| 5,242,969 A * | 9/1993 | Arpin et al. ............ 524/458 |
| 5,300,547 A | 4/1994 | Hagenson et al. |
| 5,376,701 A | 12/1994 | Chow et al. |
| 5,447,689 A * | 9/1995 | Gibboni et al. ............ 422/56 |
| 5,470,658 A | 11/1995 | Gasca et al. |
| 5,643,989 A | 7/1997 | VanDeGrampel et al. |
| 5,646,207 A | 7/1997 | Schell |
| 5,661,213 A | 8/1997 | Arkens et al. |
| 5,670,255 A * | 9/1997 | Temple et al. ............ 428/392 |
| 5,789,329 A | 8/1998 | Eastes et al. |
| 5,883,023 A | 3/1999 | Martine et al. |
| 5,900,454 A * | 5/1999 | Kirchmeyer et al. ........ 524/522 |
| 5,932,689 A | 8/1999 | Arkens et al. |
| 5,955,547 A | 9/1999 | Roberts et al. |
| 5,977,232 A | 11/1999 | Arkens et al. |
| 6,106,982 A | 8/2000 | Mientus et al. |
| 6,139,955 A | 10/2000 | Girgis |
| 6,207,737 B1 | 3/2001 | Schell et al. |
| 6,211,280 B1 | 4/2001 | Schell |
| 6,419,981 B1 * | 7/2002 | Novich et al. ............ 427/180 |
| 6,451,919 B1 | 9/2002 | Aglietto et al. |
| 6,551,707 B1 | 4/2003 | Adzima et al. |
| 6,593,255 B1 * | 7/2003 | Lawton et al. ............ 442/59 |
| 6,833,182 B2 * | 12/2004 | Audenaert et al. ........ 428/297.4 |
| 6,926,767 B2 * | 8/2005 | Chen ............ 106/243 |
| 2001/0016259 A1 | 8/2001 | Campbell et al. |
| 2002/0198301 A1 | 12/2002 | Campbell et al. |
| 2004/0002569 A1 | 1/2004 | Kitano et al. |
| 2004/0229985 A1 | 11/2004 | Kashikar |
| 2005/0163998 A1 | 7/2005 | Kashikar et al. |
| 2006/0083922 A1 | 4/2006 | Kashikar et al. |

FOREIGN PATENT DOCUMENTS

| | | |
|---|---|---|
| EP | 0 278 409 | 8/1988 |
| EP | 0 404 303 | 12/1990 |
| EP | 0 430 109 | 6/1991 |
| EP | 1 460 166 | 9/2004 |
| JP | 10-291841 | 4/1998 |
| JP | 10-324544 | 8/1998 |
| WO | WO 00/48957 | 8/2000 |
| WO | WO 02/088044 | 11/2002 |
| WO | WO 2004/031246 | 4/2004 |

* cited by examiner

*Primary Examiner*—Jill Gray
(74) *Attorney, Agent, or Firm*—James J. Dottavio; Kathryn W. Grant

(57) ABSTRACT

A fiber size composition contains a modified polyolefin, a hydrophilic coupling agent, a boron-containing, fluorine-containing compound, a blend of at least two fatty acids and a compound selected from phosphorus(V) compounds and sulfur(VI) compounds, the fiber size composition being substantially free of conventional lower oxidation state antioxidants and optical brighteners. Composite materials produced from reinforcing fiber materials sized with a fiber size composition according to the invention exhibit improved properties such as, for example, increased strength and/or improved color stability.

28 Claims, No Drawings

FIBER SIZE, SIZED REINFORCEMENTS, AND ARTICLES REINFORCED WITH SIZED REINFORCEMENTS

CROSS REFERENCE TO RELATED APPLICATION

This application is a Continuation-in-Part of U.S. application Ser. No. 10/982,462, filed Nov. 5, 2004, which was, itself, a Continuation-in-Part of U.S. application Ser. No. 09/847,009, filed May 1, 2001. The contents of both of these applications are incorporated herein, by reference, for all purposes and to the fullest extent both applicable and consistent with the disclosure provided below.

TECHNICAL FIELD AND INDUSTRIAL APPLICABILITY

The present invention relates to fiber size compositions for coating glass or other reinforcing fiber materials that are, in turn, used to manufacture composites exhibiting improved properties such as, for example, improved strength and increased resistance to chemical degradation including hydrolysis and detergent degradation. The fiber size compositions of the present invention can be used to produce composites having more neutral or natural coloring, and/or reducing or eliminating discoloration associated with conventional fiber size compositions without requiring the use of an optical brightener and without the use of conventional antioxidants and reducing agents.

The fiber size compositions of the present invention may also be used to coat reinforcing fibers for use in composites that may currently or subsequently incorporate one or more pigments or dyes to obtain a desired color. In this regard, the size composition according to the invention will tend to allow for better color matching during the pigmentation process and may reduce or eliminate the need for color compensating additives.

The fiber size compositions of the present invention are believed to have particular utility for coating glass fibers such as glass fibers including, for example, low boron and/or low fluorine or essentially boron-free and/or fluorine-free glasses used in the manufacture of glass-reinforced composites. Fiber size composition are used, inter alia, for improving the strength and/or abrasion resistance of composites reinforced with fibers coated with one or more exemplary size compositions according to the present invention. The fiber size compositions according to the present invention will also typically include one or more compounds for improving resistance to discoloration associated with or resulting from, for example, oxidation, hydrolysis and/or detergent exposure.

The present invention relates to fiber size compositions that may be formulated as an aqueous emulsion that can include a blend of fatty acids, a grafted polyolefin, one or more phosphorus and/or sulfur containing compounds from which the size composition can be prepared, an coupling agent (for example the commercially available aminosilane coupling agent A-1100), and a boron, fluorine or boron-fluorine compound (for example, $NaBF_4$).

BACKGROUND OF THE INVENTION

The reinforced composite industry has used reinforcing fibers, such as glass, mineral or polymeric fibers, in the form of continuous or chopped fibers, strands, and rovings for reinforcing a wide range of polymer compositions suitable for use in a wide range of applications. The reinforced products formed from such reinforced polymers may, in turn, be used in manufacturing a wide range of composite products that tend to exhibit improved resilience and strength relative to that which can be achieved with similar, but un-reinforced polymers and/or products. Such composite products may also be manufactured or processed in a manner sufficient to incorporate one or more decorative and/or functional elements into the products such as patterns, surface embossing, reinforcing structures and coloration.

Glass reinforced polyolefin composites are widely used in a variety of industries including, for example, automotive, construction, electrical, toys, sports equipment, appliances, and household furnishings. The use of a particular fiber and/or polymer(s) to manufacture a reinforced polyolefin may be guided by both the desired properties of the resulting composition to exhibit a particular combination of properties including, for example, mechanical, physical, chemical, and aesthetic properties.

The sizing compositions contribute to determining the final properties of the reinforced composite part. For example, during the manufacture of a composite part, and without tending to be bound to any particular theory or mechanism, it is believed that fiber size compositions form an interphase between the reinforcing fiber and the polymer matrix. When a load is applied to the composite part, force is transferred from the matrix to the fibers. The efficient transfer of this load and a good degree of adhesion between the fiber-interphase-polymer matrix is generally achieved by using an appropriate fiber size composition applied to the fibers.

Accordingly, there remains a need for a fiber size composition that can form an interphase that is strong, resistant to thermal degradation, resistant to chemical degradation, provides good adhesion between the fiber and fiber size composition, and provides good adhesion between the fiber size composition and the polymer matrix. Also, the fiber size composition must be compatible with both the reinforcing fibers, which may be inorganic, and the polymer matrix, which may be organic.

Inorganic compounds including sodium, potassium, and calcium tetraborates and sodium borohydride are reported in Japanese Kokai 10[1998]291841 ("JP '841") and 10[1998]324544 ("JP '544"), the contents of which are incorporated herein, by reference, for all purposes and to the fullest extent both applicable and consistent with the disclosure provided below. These Japanese patent applications are generally directed to improving the performance of epoxy and urethane sizing compositions, but it is noted that epoxy resins tend to exhibit poor adhesion to the reinforcing fiber while polyurethanes, although having good adhesion to the reinforcing fiber, tends to adhere more poorly to the matrix resin. These patents do not, however, teach one of ordinary skill in the art how to improve the resistance of the final composites to discoloration. Further, these patents also do not teach or suggest the use of boron-fluorine compounds or other boron containing compounds in the sizing compositions.

In order to achieve composites with improved color and color stability, fiber size compositions preferably comprise thermally stable ingredients and/or supplemental additives that will tend to suppress oxidation of those components that are more susceptible to oxidation and discoloration. As used herein, the terms "size" and "sizing" refer to a composition applied to or a coating of such a composition provided on fibers for modifying the fiber surface characteristics over the entire length and fibers' performance by, for example, improving abrasion resistance during subsequent processing and/or promoting adhesion between the fibers and the polymeric materials to which they may be added as reinforcement.

While applying the sizing to the forming fibers that are gathered in bundles or strands some physical binding between filaments may occur and be present after drying, the sizing formulation can be selected in such a way that it promotes the dispersion of the sized fibers into the composite part. In fact, the sizing composition should be selected so as not to interfere or hinder to any significant degree the ability to disperse the sized fibers throughout the polymeric matrix. That is, the sizing should not tend to promote or increase agglomeration of the fibers, especially when such fibers are being incorporated into a polymeric matrix composition. This feature of the sizing compositions is in direct contrast to the effects of "binder" compositions with the later emphasizing the binding of a strand (gathered from a plurality of individual filaments) with other strands at their crossing points (intersection) so as to form mats, fabrics, non-woven or veils and provide strength and dimensional or form stability. Indeed, examination of a fiber mat treated with a binder composition will tend to reveal "beads" of the cured or dehydrated binder composition at or surrounding intersections of adjacent strands throughout the mat. In sizing, the emphasis is on coating substantially the entire surface of each and every filament over its entire length and thereby improving the fiber-interphase-matrix adhesion through physico-chemical interactions. Given the different goals, binder compositions are typically chemically and functionally distinct from sizing compositions that are applied separately to the filaments after they have been coated with a suitable sizing composition.

Additionally, in many sizing compositions, the surfactant package used in the film former emulsion contains low molecular weight compounds which may be unsaturated, have one or more amine groups, or have amino groups which may be characterized as cationic in nature. These compounds will tend to reduce the oxidation resistance of the resulting composition and contribute to degraded composite properties as reflected by, for example, excessive or premature discoloration of the composite part. The low molecular weight compounds include, for example, unsaturated fatty acids and amine based sizing additives and neutralizing agents.

Discoloration of molded composite products, or in the raw materials used to manufacture molded composite products, may be at least partially attributed to contaminants or impurities in one or more of the raw or source materials used to form the composite formulation, or from the presence of contaminants or impurities in the ingredients that are used to form fiber-reinforced composites such as fiber size compositions applied to the reinforcing fibers.

For example, conventional sizing compositions can impart a yellow color or other discoloration to fiber reinforcements coated with such sizing compositions. This discoloration can then be carried over into the composite fiber-reinforced products as the reinforcing fibers are dispersed through the polymeric matrix. Discoloration of the composite products may also be the result of oxidative decomposition of polyolefins or unsaturated compounds, such as surfactants and/or lubricants, which have relatively low thermal stability. Discoloration of the composite products may also be caused by exposure to various nitrogen containing compounds, such as amides, imides, cationic surfactants or amine-based chemicals, which may have been used, for example, as neutralizing agents during production of the polymeric matrix or sizing compositions.

Historically, attempts to suppress or eliminate discoloration have utilized additives such as antioxidants in the composite formulation to counteract or interrupt one or more of the chemical processes that result in the discoloration. Antioxidants are frequently used in the compounding formulations for reducing thermal degradation and associated discoloration during subsequent processing. Other additives include colorants, e.g., a pigment or dye such as $TiO_2$, intended to conceal or counteract the anticipated discoloration of the composite formulation. For example, a blue pigment or dye added to a composite formulation susceptible to yellowing discoloration can produce a composite product that appears to be "whiter."

More recently, efforts to suppress discoloration of composite products have begun to focus on the use of an optical brightener, such as a fluorescent whitening or brightening agent, added to the composite formulation and/or to the sizing compositions used in forming the reinforced composite products. U.S. Pat. No. 5,646,207, for example, describes a sizing composition that includes a fluorescent whitening agent in addition to other sizing ingredients such as a carboxylated polypropylene, a silane coupling agent, and a lubricant, to reduce the apparent discoloration of the final product. A related patent, U.S. Pat. No. 6,207,737 discloses the use of whitening agents in combination with various stabilizers such as phosphinates, phosphonites, phosphites, hypophosphites, sulfites and bisulfites that are intended to suppress oxidation of the matrix polymer in which the material is used.

Incorporating one or more optical brighteners does not, however, address the underlying discoloration in the molded composite. Indeed, as noted in U.S. Pat. No. 5,646,207, as a result of difficulties in uniformly dispersing the optical brighteners throughout the matrix polymer, discoloration problems can remain in the molded composite product even when a fluorescent whitening agent is incorporated into the composition.

Other technical problems are associated with the use of optical brighteners in both composite formulations and sizing compositions for fiber reinforcements. Technical problems typically include some degradation of the properties of the composite matrix polymer and/or undesirable interactions with one or more of the other composite ingredients. For example, optical brighteners can accelerate degradation of the matrix polymer when it is exposed to ultraviolet (UV) light or other forms of radiant energy. Moreover, optical brighteners themselves can degrade and thus actually contribute to the discoloration of molded composite articles. Similarly, optical brighteners can react with antioxidants, thereby reducing the efficiency of both ingredients, and increasing the likelihood of discoloration. Further, color analysis of molded articles containing optical brighteners is difficult because the brighteners, and hence the molded articles, appear to be different colors under different lighting types and conditions, further complicating efforts to maintain a consistent final color.

Additionally, it has been observed that it is difficult to achieve a sufficient degree of color matching between individual composite batches, particularly when using one or more optical brighteners. In order to compensate for changes in the source materials, varying amounts of selected pigments or other additives can be added to the composite. Because of the number of ingredients contributing to the final color and the potential interaction between various ingredients, it may be very difficult to maintain consistent color between batches of composite material.

The difficulties associated with obtaining composite batches within an acceptable color range will, in turn, increase the overall cost of production by requiring increased quantities of the various starting materials, higher labor costs and increased "scrap" or "rework" material. The use of optical brighteners also contributes to increased production costs simply because the optical brighteners are relatively expensive. Accordingly, each of these technical difficulties poses a corresponding economic disadvantage to efforts to produce a competitive and economical fiber-reinforced composite product.

EP0826710 B1 discloses binder composition using a combination cross-linking accelerators (tetrafluoroborates and/or hypophosphinates) for cross-linking/curing polyacids to form polymeric binder compositions that improve the tear strength of the fiber non-woven veils or mats formed through binding adjacent fibers at their crossover and contact points as well as those regions where the fibers are sufficiently closely spaced to allow for cross-linking of the binder composition between the two adjacent portions of the fibers in nonwoven materials. Although perhaps useful in promoting a cross-linking reaction among the two carboxylic acid groups of the polyacid and hydroxyl or amine compounds, the use of such compounds in compositions apart from binder compositions useful for cross-linking that improve the tear strength of the non-woven veils or mats is not mentioned or suggested.

In U.S. Pat. No. 5,221,285, alkali metal dihydrogenphosphate, and alkali metal salts of phosphorous, hypophosphorous and polyphosphoric acids, are used as catalysts in the esterification (polyester) and crosslinking of cellulose and polycarboxylic acids to form wrinkle resistant fabrics. For example, although sodium tetraborate, boric acid, and sodium borohydride are used to suppress or reduce discoloration resulting from the cross-linking of a cellulosic material with an α-hydroxy acid, there is no teaching or suggestion that such compounds would have any particular utility in a sizing composition to be applied to the surface of forming glass fiber surface and their use as reinforcements in making glass fiber reinforced composites.

Therefore, it is an object of the present invention to provide economical fiber size compositions that maintain or improve the color stability and/or the mechanical properties (particularly as evaluated in both short-term and long term (aged) mechanical properties) for the composite parts. The sizing composition that has been developed to provide this combination of features incorporates an effective amount of one or more of fluorine compounds, boron compounds and/or fluoroborates.

It is an object of the present invention to produce sizing compositions that exhibit improved resistance to discoloration.

It is an object of the present invention to produce sizing compositions that exhibit improved resistance to discoloration without incorporating conventional stabilizers.

It is an object of the present invention to produce sizing compositions that exhibit improved resistance to discoloration by incorporating phosphorus and/or sulfur compounds in which the phosphorus and/or sulfur atoms are in their highest oxidation state.

It is an object of the present invention to produce sizing compositions that exhibit improved resistance to discoloration by incorporating one or more of the boron-, fluorine-, boron-fluorine compounds.

It is an object of the present invention to produce composite articles exhibiting decreased discoloration and provide a method for producing such composite articles.

It is an object of the present invention to produce composite articles exhibiting increased brightness to composite articles incorporating fibers sized or coated with a fiber size composition corresponding to the present invention.

It is an object of the present invention to provide improved color compatibility between composite articles incorporating reinforcing fibers sized or coated with a fiber size composition corresponding to the present invention.

It is an object of the present invention to provide improved whiteness, brightness, and/or color compatibility to composite articles made with fibers sized with the fiber size composition of the present invention without incorporating an optical brightener.

It is an object of the present invention to provide whiteness brightness, and/or color compatibility to composite articles made with fibers sized with the fiber size composition of the present invention without incorporating a conventional antioxidant It is an object of the present invention to provide whiteness brightness, and/or color compatibility to composite articles made with fibers sized with the fiber size composition of the present invention with no negative (side effects) interactions with the added conventional antioxidant It is an object of the present invention to provide whiteness brightness, and/or color compatibility to composite articles made with fibers sized with the fiber size composition of the present invention in synergy with a conventional antioxidant It is an object of the present invention to provide improved whiteness, brightness, and/or color compatibility to composite articles incorporating fibers sized with a fiber size composition according to the present invention while maintaining desirable strength properties of the molded composite article.

It is yet another object of the present invention to provide composite articles made with fibers sized with a fiber size composition according to the present invention that exhibit improved resistance to oxidation degradation.

It is an object of the present invention to provide composite articles made with fibers sized with a fiber size composition of the present invention that resist discoloration.

It is an object of the present invention to provide composite articles made with fibers sized with a fiber size composition according to the present invention that resist thermal degradation.

It is an object of the present invention to provide composite articles made with fibers sized with a fiber size composition according to the present invention that create a stronger interphase between the fiber and matrix resin.

It is an object of the present invention to provide composite articles made with fibers sized with the fiber size composition according to the present invention that exhibit desirable short-term mechanical and aging properties.

It is an object of the present invention to provide composite articles made with fibers sized with a fiber size composition according to the present invention that exhibit long-term aging as well as long-term mechanical properties.

It is another object of the present invention to provide composite articles made with fibers sized with a fiber size composition according to the present invention that exhibits improved resistance to chemical breakdown.

It is an object of the present invention to provide composite articles made with fibers sized with a fiber size composition according to the present invention that exhibits increased resistance to thermal degradation.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY OF THE INVENTION

The above problems are addressed and the various objects met by the present invention which features a fiber size composition comprising a) a modified polyolefin, typically a graphed polyolefin, b) a hydrophilic coupling agent, typically an aminosilane and c) an enhancer having at least one of the following: 1) one or more fatty acids, including cyclic fatty acids or fatty dimer diacids 2) a phosphorus and/or sulfur compound in which the phosphorus and/or sulfur atom is in its highest oxidation state, 3) at least one compound selected from boron-containing compounds, 4) at least one compound selected from fluorine-containing compounds, 5) at least one compound selected from fluoro-boro compounds, typically $NaBF_4$ or $NH_4BF_4$, 6) at least one hydrophobic coupling agent, typically as an alkylsilane or vinylsilane and 7) mixtures of or any combinations of components mentioned in 1) though 6).

The fiber size composition can be provided as an aqueous emulsion and can include modified polyolefins such as maleic anhydride modified polypropylenes having relatively high molecular polymer weights, e.g., typically at least 10,000 and possibly more than 100,000. The modified polyolefin can be formed as a nonionic aqueous polymer emulsion from a single, pressurized, heated and stirred mixture of the modified polyolefin, a fatty acid, a nonionic surfactant, a base, and water.

The coupling agent, typically a silane, and, in particular, an amino-silane, will typically include functional groups that include at least one group that is reactive with a fiber surface and at least one second group that is reactive with the modified polyolefin. Although the composition is not so limited, for most silanes these functional groups tend to be hydrophilic and usually soluble in water.

Conventional antioxidants, e.g., phosphorous-containing compounds in which the phosphorous is not at its highest oxidation state such as, for example, phosphites, hypophosphites, and mixtures thereof, if present, are typically excluded or purposely not included in the fiber size composition. The present size compositions tend to exhibit satisfactory performance without using conventional antioxidants, which are typically phosphorus or sulfur compounds at an intermediate or lower oxidation state, i.e., not P(V) and/or S(VI) compounds. The present size composition delivers excellent performance when P(V) and/or S(VI) compounds are used. The present invention also delivers excellent performance and will tend to provide complementary and/or synergistic effects when combined with other more conventional antioxidants (typically phosphites, hypophosphites and other phosphorous or sulfur based lower oxidation state antioxidants).

The boron-containing compounds and/or fluorine-containing compounds may include additionally fluorine or boron respectively, such as fluoroborates. Sodium or potassium tetrafluoroborate, ammonium tetrafluoroborate, tetrafluoroboric acid ($HBF_4$), are suitable compounds for the fiber size compositions and have been found to improve the strength and color characteristics of various composites formed from fibers coated with the fiber size of the current invention. Other generally suitable boron-containing and fluorine-containing compounds include, for example, borohydrides, perborates, borosilicates, boron nitride, organoboron compounds, borazoles, boron halides, tetraborates, such as sodium tetraborate ($Na_2B_4O_7$), boric acid ($H_3BO_3$), alkali metal and/or ammonium fluorides, bi-fluorides, alkali metal and/or ammonium tetrafluoroaluminate, alkali metal and/or ammonium hexafluorozirconate and mixtures thereof.

One or more hydrophobic coupling agents selected, for example, from the alkylsilanes or vinylsilane, may be added to improve the silane coating on the fibers. The addition of the hydrophobic coupling agents may, in some instances, provide improved resistance to hydrolysis aging to the composite parts.

Other minor polymeric materials can be included in the size composition in addition to the primary modified polyolefins. For example, polyurethane can be incorporated in the fiber size composition for improving the processing characteristics of the size composition and for improving fiber integrity during subsequent processing of the sized fibers.

If one or more of the ingredients of the size composition has a partially hydrophobic character, may be necessary to add additional ingredients to aid in forming the fiber size composition emulsion. Such agents can include wetting agents, lubricants, surfactants, and antifoam agents. However, agents, especially those based on alkylphenols and agents with unsaturated functionality and any other ingredients, ionic or non-ionic or ingredients with or without nitrogen functionality that would lead to discoloration, should generally be avoided for reducing discoloration issues as well as associated safety and environmental issues. If unsaturated agents are incorporated into the size composition, it is preferred that the Iodine Value of the components of the fiber size composition other than the modified polyolefin should each have a value of less than about 0.35.

Glass fibers are typically coated with the fiber size composition as part of the fiber filament formation process. By coating the fiber filament with the size composition early in the process the fiber size coating will be available to protect the filaments from abrasion and breakage during subsequent processing. The fiber size composition can be applied to any fibrous materials including synthetic, non-synthetic, organic, inorganic, mineral fibers or glass fibers, such as E-glass fibers (a borosilicate glass) as well as low boron or boron-free fibers. As the water in the fiber size composition evaporates, a thin layer of the size composition actives will tend to form a thin layer on the surface of the treated fibers.

After the fiber is coated with the fiber size composition, the coated fiber can be incorporated into a compounding formulation that includes at least the size coated (reinforcing) fiber and a matrix resin. The matrix resin can be selected from a wide variety of plastics including polyolefins, particularly polypropylene and polyethylene, polyesters, polyacetals, polyamides, polyacrylamides, polyimides, polyethers, polyvinylethers, polystyrenes, polyoxides, polycarbonates, polysiloxanes, polysulfones, polyanhydrides, polyimines, epoxies, polyacrylics, polyvinylesters, polyurethane, maleic resins, urea resins, melamine resins, phenol resins, furan resins, polymer blends, polymer alloys and mixtures of them. The compounding formulation can also contain one or more compounding agents such as coupling agents, antioxidants, pigments, dyes, antistatic agents, fillers, flame retardants, UV stabilizers, impact modifiers and other additives. The compounding formulation is then typically processed to form flowable pellets or beads for convenient storage, shipment and further use.

The foregoing and other objects, features and advantages of the invention will become apparent from the following disclosure in which one or more preferred embodiments of the invention are described in detail and illustrated in the accompanying examples. It is contemplated that variations in procedures, selection of component compounds, and their manner of interaction may appear to a person skilled in the art without departing from the scope of or sacrificing any of the advantages of the invention.

DETAILED DESCRIPTION OF EXEMPLARY EMBODIMENTS

The present invention provides an improved fiber size composition that comprises a modified polyolefin; a hydrophilic coupling agent; and at least one enhancer selected from a group consisting of fatty acids including cyclic fatty acids and fatty dimer diacids, boron-containing compounds, fluorine-containing compounds, fluoro-boro compounds, hydrophobic coupling agents, phosphorus(V) compounds and/or sulfur (VI) compounds; mixtures or combinations of compounds selected from above mentioned compounds. Other embodiments of the invention include size compositions that incorporate one or more P(III) and/or S(IV) compound that can also be used in combination with one or more higher order P(V) and/or S(VI) compound.

The improved fiber size composition provides satisfactory composite performance and color stability without necessarily incorporating either conventional antioxidant compounds such as any primary and or secondary antioxidants including phosphonates, phosphonites, phosphites, hypophosphites, sulfites, bisulfites, phenolic based, lactone, ester, amine based light stabilizes, hindered amine light stabilizers and aryl amine based optical brighteners, etc. The improved fiber size composition also provides satisfactory composite performance and color stability in synergy with other added conventional antioxidant.

The present invention comprises a substantially non-discoloring fiber size composition. The terms "substantially non-discoloring" or "having minimal discoloration," as used herein, refers to fiber size compositions that result in reduced discoloration, if any, relative to the performance of conventional size compositions. This improvement will be evident when the fiber size composition is applied to a fiber material, when the sized fiber is incorporated into a compounding formulation, and when a composite article prepared from the compounding formulation. Accordingly, the fiber size compositions according to the present invention will tend to improve and/or tend to preserve the initial white, off-white or neutral color of the initial polymeric materials. Accordingly, the consistency and uniformity of the initial or base color of the molded composition will be improved, thereby simplifying color matching of the final product(s) from batch to batch. This improved color stability reduces the manufacturing time and expense associated with trying to color match conventional compositions that rely to some extent on the incorporation of one or more optical brighteners to reduce or conceal discoloration associated with the size composition.

Although the precise mechanism for improving the color stability of the resulting polymeric compositions is not known, without being bound by any particular theory, it is believed that the substantially non-discoloring effect of the fiber size compositions according to the invention may be due, in part, to the to presence of one or more of the chosen enhancer ingredients of the sizing formulation. It is believed that one or more of the incorporated ingredients into the inventive fiber size compositions provide improved resistance to discoloration, even without the use of any conventional antioxidants or reducing agents.

Further, the various components of the size composition other than the modified polyolefin are preferably based mainly on molecular species that include no reactive double bonds, i.e., are fully "saturated," or that include only relatively few reactive double or triple bonds, i.e., are "highly saturated." As used herein, the term "highly saturated," refers to fiber size composition components, other than the modified polyolefin, in which the components tend to have relatively low Iodine values (also referred to on occasion as an Iodine Number), which is a measure of proportion of double bonds within the compound. It is preferred that the Iodine values are at or near zero, but compounds having Iodine values of up to about 0.35 or above, although not preferred, may still be suitable for some applications. Accordingly, the other components of the sizing composition should be selected to reduce or eliminate unsaturated, especially conjugated, species, including, for example, certain conventional surfactants, lubricants, wetting agents, anti-foaming agents, emulsifiers, coupling agents, and other compounds that may be found in typical fiber size compositions.

The fiber size composition of the present invention preferably comprises one or more film forming polymers selected from the group of grafted or chemically modified polyolefins. As used herein, the term "grafted polyolefin," "functionalized polyolefin," "chemically modified polyolefin" or simply "modified polyolefin," refers to a polymeric olefin that has been chemically modified and functionalized to incorporate one or more reactive functional groups on the main polyolefin polymer chain. Typically, the modified polyolefin is based on olefin monomers having from two to six atoms, including, for example polyethylene, polypropylene, polybutene, polyisobutylene, and polyhexene. Preferred polymers include the homo- and co-polymers of polypropylene that are crystalline, semi-crystalline, amorphous, or rubbery and elastomeric and mixtures thereof. The grafted polyolefins may be used alone as film forming agent but may also be combined with other film forming oligomeric or polymeric agents, e.g., based on glycidyl acrylates, glycidyl methacrylates, styrene-maleic anhydride, polyesters, polyethers, polyurethanes, polyamides, polyimides polyvinylpyrolidones, acrylic acids, methacrylic acids and their co- or graft polymers or any other polymers that are known for their ability to achieve the desired effects including the ability to form films.

Reactive functional groups are groups that are capable of undergoing further chemical reactions with other chemical species. Some examples of such reactive functional groups are acid anhydride, carboxylic acid, hydroxyl, amino, amide, ester, isocyanate, double bonds, and epoxy groups. Although many types of reactive functional groups can be attached to the polyolefin chains, as noted above, it is desirable to avoid unreactive and unreacted nitrogen-containing and conjugated unsaturated functional groups. Accordingly, acid anhydride, carboxylic acid, hydroxyl, and epoxy groups are preferred for preparing the modified polyolefin. More preferred are reactive functional groups such as maleic acid, acrylic acid, methacrylic acid, maleic anhydride, acrylic anhydride, methacrylic anhydride, and oxiranes such as glycidyl acrylates or methacrylates with the most preferred groups being acid anhydride groups. These reactive groups may also be present on film forming agents other than polyolefins.

Modified polyolefins, such as modified polypropylenes, are commercially available as aqueous emulsions. Preferred emulsions are those based on nonionic surfactants, lubricants, wetting agents, emulsifiers, and other ingredients that tend to not to contribute to the oxidation and/or discoloration of the composite composition. Generally, the level of grafted functional groups ranges from about 0.025% to about 15 wt. % based on the total weight of the polymer. Typically, the amount of the grafted polyolefin in the fiber size composition ranges from about 20 wt. % to about 90 wt. %, based on the total dry solids content of the fiber size composition. Preferably, the amount of grafted polyolefin used is from about 30 wt. % to about 85 wt. % of the total dry solids. Most preferably, the amount is between about 35% to about 80 wt. % of the total dry solids content of the aqueous fiber size composition.

Higher molecular weight modified polypropylenes, i.e., polypropylenes having molecular weights greater than about 10,000 (or even greater than about 100,000), are preferred for use in the fiber size composition and are believed to improve the strength of the resulting fiber reinforced composite. Unfortunately, it has been difficult to provide high molecular weight polypropylenes in a form suitable for fiber application during fiber manufacture. Various techniques for emulsifying these polymers have included hydrocarbon solvents, multiple processing steps, and grinding and blending at high shear and relatively high temperatures. These techniques, however, tend to result in excessive degradation and deterioration of the basic polypropylene structure as reflected in degraded mechanical properties and reduced color retention in the resulting fiber reinforced composites.

U.S. Pat. No. 6,818,698, which issued Nov. 16, 2004, the contents of which are hereby incorporated by reference, in its entirety and for all purposes consistent with the present disclosure, describes a method for the aqueous emulsification of high molecular weight polyolefins that apparently reduces or prevents the traditional problems in preparing such emulsions, even for polypropylene polymers having molecular weights greater than about 80,000 and even greater than about 100,000.

All components of the modified polyolefin emulsion are preferably selected for improving the strength and/or the color stability and uniformity of the formulations and/or composite products that incorporate the emulsion. As indicated above, higher molecular weight polypropylenes are preferred for the polyolefin base, particularly polypropylenes having molecular weights above about 10,000; about 35,000; about 80,000; and about 100,000, respectively. Nitrogen-free functional groups such as maleic anhydride, maleic acid and carboxylic acid may be attached to the polymer for forming the modified polyolefin. Functional groups that are unsaturated or having conjugated unsaturation and/or contain nitrogen will generally not be included in any significant amount to reduce subsequent discoloration of the composition.

The substantially non-discoloring fiber size composition of the present invention also comprises at least one hydrophilic coupling agent, typically an aminosilane coupling agent. The hydrophilic coupling agent improves the adhesion between the reinforcing fiber material and the polymer matrix resin that is being reinforced. Without being bound by any particular theory, it is believed that the coupling agent forms a "bridge" between the glass fibers and the matrix resin when reactive functional groups on the coupling agent interact with functional groups on the surface of the fibers and/or the film-forming agent (the modified polyolefin) of the fiber size composition. Because the functional groups involved are typically polar in nature, the coupling agent tends to be hydrophilic and readily dispersed in an aqueous size composition. Accordingly, such coupling agents may also be referred to as "hydrophilic coupling agents."

As discussed above, the film-forming component of the fiber size composition will be selected on the basis of its compatibility with the matrix resin. This allows the fibers and their layer of fiber size composition to be dispersed more easily throughout the matrix resin and may induce stronger physical and/or chemical bonding between the size composition and the matrix resin. The hydrophilic coupling agent, which can bond to glass surface chemical groups, can also react with the matrix resin chemical groups and/or any other additives present in the system having suitable chemical groups for interaction, and thereby increase the attachment between the reinforcing fiber and the matrix resin.

A variety of hydrophilic coupling agents are known to those skilled in the art, particularly a range of silicon-based "silane" coupling agents that may be represented by the general formula $X_n$—Si—$Y_{4-n}$, where X is an acid and/or anhydride reactive group and Y is a fiber reactive group, and n is preferably 1 but may be 2 or 3. Typically Y will be an alkoxy that will be hydrolyzed to from a hydroxyl group in the fiber size composition and X will be an alkyl amino group, but silanes including other functional groups are commercially available. Aminosilanes are compounds that include at least one functional chemical group that includes nitrogen, e.g., a primary, secondary or tertiary amino group, and at least one hydroxyl group attached to silicon after hydrolysis. A variety of aminosilanes are commercially available from OSi Specialties, Inc., located in Tarrytown, N.Y., United States of America, Dow Corning, Inc. located in Midland, Mich., United States of America, and Degussa-Huls AG located in Frankfurt, Germany. A preferred aminosilane coupling agent is Union Carbide's A-1100, a γ-aminopropyltriethoxysilane. Examples of silanes having functional groups other than amino functional groups include, but are not limited to: vinyl-trimethoxysilane (commercially available as A-171), gly-cidyloxypropyltrimethoxysilane (commercially available as A-187), and methacryloxypropyltrimethoxysilane (commercially available as A-174), all of which are available from GE Osi Specialties, Inc.

The hydrophilic coupling agent is generally included in the fiber size composition at a concentration of about 0.05% to about 40 wt. % on the basis of the total dry solids of the fiber size composition. Preferably, the hydrophilic coupling agent is used in an amount of from about 0.2% to about 35 wt. % total dry solids. Most preferably, the amount is between about 1% to about 30 wt. % of the total dry solids in the fiber size composition. Other coupling agents based on transition metal complexes rather than silicon, including, for example, titanium, chromium, zirconium, that also include the requisite amino-group based coupling functionality may also be included alone or combined with the silicon-based aminosilanes.

The present invention features a fiber size composition with several enhancer components that may be used alone or in combination with each other. These enhancer components include boron-containing compounds, fluorine-containing compounds, fluoro-boro compounds, hydrophobic coupling agents, cyclic fatty acids, and combinations of at least two saturated fatty acids with one of those fatty acids having at least two acid groups. The enhancer components will preferably also include at least one phosphorus or sulfur compound in which the phosphorus or sulfur is at its highest oxidation value, i.e., a P(V) and/or a S(VI) compound. The enhancer components are believed to promote linkages among the various components of the fiber-reinforced composite, enhance the interface between these components and/or interfere with conventional thermal changes.

For example, an enhancer can improve the interactions among the sizing ingredients and interaction of the sizing ingredients to the fiber and to the matrix resin thereby enhancing the fiber-matrix interphase. An enhancer can enhance the interface between the fiber and polymeric materials by providing a hydrophobic environment that discourages the degrading effects of water and moisture. An enhancer can provide an environment that reduces discoloration at the coated sizing on the fibers as well as at the interface between the glass fiber and the matrix resin.

The substantially non-discoloring fiber size composition of the present invention includes a blend of at least two (that is, two or more) saturated fatty acids with one of the fatty acids having at least two fatty acid groups. As used here, the term "fatty acid" includes, besides $C_8$-$C_{40}$ alkyl chain fatty acids, also the lower alkyl acids such as succinic, propionic and butyric acid. In one aspect, this blend of fatty acids may serve as a nucleating agent, which is believed to affect the size and rate of crystallite (serite) growth in the reinforced composite. The rate of formation and the size of the resulting crystallites have a direct and proportionate effect on the performance of the reinforced composite.

In another regard, the blend of saturated fatty acids serves as a lubricant in the fiber size composition. Whereas sizing compositions previously known in the prior art included lubricants such as the cationic lubricant disclosed in WO 048957A1, the fiber size composition of the present invention eliminates the need for a lubricant as a separate ingredient in addition to the fatty acid blend. In the fiber size composition of the present invention, the lubricant effect is provided by the fatty acid blend and protects the fibers from breakage and shear stress. Also, it will generally reduce damage to the filaments during fiber production, handling and composite manufacturing ensuring better composite performance.

The fatty acid blend also acts as a wetting agent providing better coverage of the fiber filaments by the fiber size composition during fiber production that protects the fibers and further enhances the performance of the reinforced polyolefin composites. The fatty acid blend acts, to a certain extent, as a mold release agent during the molding operation thereby providing better surface finish to the composite parts and faster molding cycle operations. Because the saturated monoacid fatty acids are hydrophobic at their alkyl end and hydrophilic at their acid group end, the saturated fatty acids also act as surfactants and eliminate the need for additional surfactants in the fiber size composition. Finally because the fatty acids of the blend are highly saturated and contain no nitrogen moieties, they are substantially non-discoloring in the final composite product.

A suitable blend of saturated fatty acids for use in the fiber size composition of the present invention may be selected from two or more $C_3$-$C_{40}$ saturated fatty acids, the salts of these fatty acids, the anhydrides of fatty acids with at least two acids groups, or mixtures thereof. As used here, the term fatty acid includes the lower alkyl carboxylic acids such as propionic and butyric acid.

Preferably, the blend of fatty acids comprises a mixture as a solution, dispersion, suspension or emulsion of highly saturated $C_3$-$C_{40}$ fatty acids, anhydrides, or salts thereof, in an aqueous or non-aqueous medium. Most preferably, the blend of fatty acids is provided as an aqueous mixture of two or more $C_3$-$C_{40}$ fatty acids, such as from the mono-acid fatty acids myristic, palmitic, pentadecanoic, margaric, stearic, behenic acid, and montanic acid and from the multi-acid group fatty acids, succinic, adipic, azelaic, pimelic, suberic, sebacic and citric acid.

An example of a suitable blend of such fatty acids is a combination of palmitic, sebacic and stearic acids, which, for example, may be obtained commercially as an aqueous emulsion under the trade name "MOLDPRO 1327" from Witco Polymer Additives, a subsidiary of Crompton Corp., Memphis, Tenn., United States of America. The amount of the blend of fatty acids may range from 0.05 wt. % to about 80 wt. %, based on the total weight of the dry solids in the fiber size composition. Preferably, the blend of fatty acids is present in a concentration range from about 0.90% to about 50 wt. %. Most preferable is a concentration of 2% to 30 wt. % of the dry solids of the fiber size composition.

In addition to the hydrophilic coupling agent discussed above in which each of the functional groups exhibits a definite polar nature, the fiber size composition can also include a hydrophobic coupling agent in which at least one of the functional groups exhibits a decidedly non-polar (hydrophobic) nature. A typical hydrophobic coupling agent is a silane that may be represented by the general formula $R_n$—Si—$Y_{4-n}$, where R is an alkyl group, such as a methyl, ethyl, propyl or butyl group, a straight-chain or branched alkyl group, or a straight-chain or branched unsaturated carbon group. The value of n may be from 1 to 3, with a value of 1 being preferred. Suitable hydrophobic coupling agents include propyltrimethoxysilane or propyltriethoxysilane and vinyltrialkoxysilane. Hydrophobic groups having conjugated unsaturated bonds are less preferred because of possible discoloration of the resulting composite material.

Y represents a fiber reactive group, typically an alkoxy group such as a methoxy or ethoxy that is hydrolyzed to a hydroxyl group in the fiber size composition. The hydrophobic coupling agent is generally included in the fiber size composition at a concentration of about 0.5% to about 20 wt. % on the basis of the total dry solids in the fiber size composition. Preferably, the hydrophobic coupling agent is used in an amount from about 1% to about 15 wt. % total dry solids. Most preferably, the amount is between about 2% to about 10 wt. % of the total dry solids in the fiber size composition.

The cyclic fatty acids of the present invention are mostly difunctional fatty acid derived dimers. They are produced by the dimerization, e.g., a Diels-Alder-type reaction of long chain unsaturated fatty acid monomers. The monomers may be branched or linear and may be mono or polyunsaturated. Generally the monomeric fatty acids have about 8 carbon atoms in their carbon backbones and may have upwards of 20 or more carbon atoms. Thus when a dimer is formed from two monomers, the dimer will have approximately 16 to 40 or more carbon atoms in the resulting product. The dimer is dibasic and has the unique advantage of being hydrophobic and having a high molecular weight. Any unsaturated bonds in the dimer acid may be subsequently eliminated by hydrogenation so as to enhance dimer stability towards discoloration.

The fatty dimer diacid is a six carbon cyclic structure to which two pendant alkyl groups and two pendant alkyl acid groups are attached at separate carbons of the cyclic structure. The fatty dimer diacid is a complex mixture of geometric, structural (positional) and conformational isomers. In addition, the dimerization process also produces some trimer acid with an eight carbon cyclic ring, three pendant alkyl acid groups and three pendant alkyl groups. Thus the dimerization of a fatty acid with 18 carbon atoms, e.g., oleic acid, will produce a mixture of 36-carbon atom dibasic acids and some 54-carbon atom tribasic acids. The cyclic fatty acids are commercially available as Pripol 1025 from Uniqema, Wilmington, Del. and Empol 1008 from Cognis Corporation, Cincinnati, Ohio. The cyclic fatty acids are generally included in the fiber size composition at a concentration of about 1% to about 30 wt. % on the basis of the total dry solids in the fiber size composition. Preferably, the cyclic fatty acids are used in an amount from about 2% to about 20 wt. % total dry solids. Most preferably, the amount is between about 4% to about 15 wt. % of the total dry solids in the fiber size composition.

A wide variety of antioxidants are used in conventional size compositions, particularly antioxidants based on phosphorous containing compounds in which the phosphorus is at an oxidation state lower than P(V) and/or sulfur compounds in which the sulfur is at an oxidation state lower than S(VI). Lower oxidation state phosphorous and sulfur-containing compounds include bisulfites, sulfites, phosphites, phosphonites, phosphinates, hypophosphites from among the alkali metals, alkaline earth metals, or ammonia. Suitable examples are sodium metabisulfite, sodium sulfite, and sodium hypophosphite, which are used to deter or suppress the oxidation processes.

The present fiber sizing composition, however, does not incorporate these or any other conventional antioxidants (although some natural trace quantities may be present), but instead comprises one or more phosphorus and/or sulfur enhancer compounds in which the phosphorus and/or sulfur are at their highest oxidation states, i.e., P(V) and/or S(VI). Such compounds, at their highest oxidation states, cannot act as antioxidants and thus are not categorized as reducing agent or antioxidant. This enhancer compound or these enhancer compounds will typically be present in the fiber size composition at a concentration of about 0.1% to about 15 wt. % on the basis of the total dry solids in the fiber size composition. Preferably, the phosphorus and/or sulfur compound(s) is/are incorporated in the size composition at a concentration of from about 0.5% to about 10 wt. %, and most preferably, at a concentration of from about 1% to 8 wt. %, based on the total dry solids in the fiber size composition. Suitable compositions may include one or more of orthophosphoric acid, and phosphates, sulfuric acid and sulfates including, for example, $H_3PO_4$, $NaH_2PO_4$, $Na_2HPO_4$, $NH_4H_2PO_4$, $(NH_4)_2HPO_4$, $(NH_4)_3PO_4$, $H_2SO_4$, $NaHSO_4$, $NH_4HSO_4$, $(NH_4)_2SO_4$, $Al_2(SO_4)_3$, aromatic alcohol phosphates, aromatic phosphoric acid esters and aromatic phosphoric acid esters salts, (for example sodium-2,2'-methylene-bis(4,6-di-t-butylphenyl) phosphate), fatty alcohol phosphates and ethoxylated phosphates.

A boron compounds such as a borohydrides, boronitrides, borazoles, perborates, borates, tetraborates or boric acid may be added to improve initial strength parameters and heat aged color parameters. Typically the boron compounds are used as the sodium salts and are generally included in the fiber size composition at a concentration of about 0.01% to about 15 wt. % on the basis of the total dry solids in the fiber size composition. Preferably, the boron compound is used in an amount of from about 0.025% to about 10 wt. % total dry solids. Most preferably, the amount is between about 0.05% to about 8 wt. % of the total dry solids in the fiber size composition. Suitable compounds containing both boron and fluorine include, for example, tetrafluoroborates ($BF_4^-$) such as ammonium tetrafluoroborate, potassium tetrafluoroborate, sodium tetrafluoroborate and tetrafluoroboric acid ($HBF_4$).

The fluorine containing compound is preferably included in the fiber-size composition at a concentration of about 0.025 wt. % to about 15 wt. % based the total dry solids in the fiber-size composition. Preferably, the fluorine-containing compound is used in an amount of from about 0.05 wt. % to about 10 wt. % based on the total dry solids. Most preferably, the amount is between about 0.1 wt. % to about 8 wt. % of the total dry solids in the fiber-size composition. Representative fluorine-based compounds include, for example, fluorides such as alkali metal fluorides, alkaline earth metal fluorides, alkali metal tetrafluoroaluminates, alkali metal hexafluorozirconates, hexafluorosilicates and other more complex compounds.

When components are used other than the fatty acid blend, which alone may serve as a wetting agent, surfactant, and lubricant, it is often necessary to include one or more additives useful for improving fiber wettability, component dispersion, and/or for generally easing the processing of the fiber size composition. The wetting agent can be an alkyl sulfosuccinic acid ester based wetting agent such as REWOPOL SBDO 75 from Rewo Chemische Werke GmbH, Germany. The dispersant/surfactant/emulsifier is a non-ionic ethoxylated alkyl alcohol such as LUTENSOL ON60 from BASF, Ludwigshafen, Germany. The lubricant can be a glycerol or glycol based fatty acid ester such as decaglycerol monostearate (POLYALDO 10-1S) ethylene glycol distearate (GLYCOLUBE 674), or GLYCOLUBE WP2200, all from Lonza, Inc., Fair Lawn, N.J., United States of America.

As noted above, ionic agents, particularly those including a nitrogen functionality, and non-ionic agents that are based on alkylphenols or ethoxylated nonylphenol compounds are not preferred for inclusion in the fiber sizing compositions of the present invention. Such compounds tend to exhibit lower stability, are more likely associated with discoloration of the final fiber-reinforced composite, and in some cases may be environmentally problematic as a result of their toxicity and/or persistence. The combination of wetting agent, emulsifier, and lubricant is typically in the range from 1-30 wt. % of the total dry solids in the fiber size composition; preferably 2-25 wt. %; and most preferred 3-20 wt. %. However, those skilled in the art will appreciate that the relative amounts of these various materials can vary greatly depending on the other components in the fiber size composition and its intended use. For example, and as noted above, when a mixture of saturated fatty acids is used in the fiber size composition the blend of fatty acids may provide some or all of the desired functionality and thereby reduce or eliminate the need for at least certain classes of additives. Other processing aids, antistatic agents, and other conventionally known additives may also be used.

An antifoaming agent may be added to the fiber size composition to reduce foam generation during mixing and handling of the fiber size composition before the fiber size composition is applied to the reinforcing fiber material and to improve the wetting and the quality of the size coating. Various types of antifoaming agents may be used—typically those that are silicone based although non-silicone products are available from such vendors as Air Products in Allentown, Pa., United States of America under the trade names SURFYNOL and DYNOL. Examples of suitable antifoaming agents include, but are not limited to, those commercially available from BYK Chemie located in Wesel, Germany under the trade names BYK-011, BYK-018, BYK-020, BYK-021, BYK-022, BYK-023, BYK-024, BYK-025, BYK-028, BYK-031, BYK-032, BYK-033, BYK-034, BYK-035, BYK-036, BYK-037, BYK-045, or BYK-080. BYK-024 is a suitable antifoaming agent for the present invention in that it contains hydrophobic solid and foam destroying polysiloxanes in polyglycol. The antifoaming agent may be added in any amount up to 2 wt. %, based on the total weight of the fiber size composition. Preferably, the antifoaming agent is between about 0.001 and about 0.5 wt. %. Most preferable is between about 0.005 and about 0.2 wt. %.

The fiber size composition may be prepared by combining the ingredients thereof according to any method known to one of ordinary skill in the art. Preferably, the fiber size composition may be made by blending the individual components of the fiber size composition with a diluent to form a solution or suspension. Most preferably, the diluent is water.

The sequence of combining the ingredients not thought to be critical to forming a stable fiber size composition. The following is illustrative of a procedure has been found to give a fiber size composition that can be applied to glass fiber filaments with good results. The aqueous emulsion of grafted polyolefin and an aqueous fatty acid blend are blended together along with any desired combination of surfactants, wetting agents and lubricants as well as aqueous solutions of any water-soluble materials before the addition of the aminosilane coupling agent.

The coupling agent is preferably added last to minimize the reactions between the ingredients, and primarily to control the viscosity of the fiber size composition prior to application. The coupling agent(s) may also be suitably combined separately with any of the suitable ingredients of the given sizing formulation before being combined with the rest of components of the sizing composition. When a hydrophobic coupling agent such as a hydrophobic silane is used, the hydrophilic silane is preferably hydrolyzed separately in water before being added to the aqueous polyolefin emulsion. Demineralized water may be added to the final mixture to bring the composition to the desired dry solids content.

The fiber size composition of the present invention provides a viscosity on the order of from about 5 cPs to about 500 cPs. As suggested above, changes in the viscosity of the fiber size composition are preferably suppressed or reduced between formation of the size composition and its application to the fiber. Controlling the viscosity will help produce a more consistent and uniform layer of fiber size composition on the surface of the reinforcing fiber material. Significant increases or decreases from the target thickness range for the layer of fiber size composition can affect the performance of the sized reinforcing fiber material in the composite.

The components, such as the emulsion of grafted polyolefin polymer and the coupling agent as well as any of the aforementioned other optional additives are preferably combined in amounts effective to formulate the fiber size composition as a stable dispersion having a storage stability of up to and above 72 hours and at temperatures of from about 10° C. to about 32° C. Although the pH of the fiber size composition is not considered critical, in most instances it is believed that a pH ranging from slightly acidic (pH 4.5) to basic (pH 11) will be acceptable for final fiber size composition.

The fiber size composition of the present invention may be applied to the reinforcing fiber material by any suitable method to form a coated reinforcing fiber material. The reinforcing fiber material to which the fiber size composition of the present invention can be applied may be selected from any reinforcing fiber materials known in the art such as glass fibers, polymer fibers, carbon or graphite fibers, natural fibers and any combination thereof. Preferably, glass fibers are used including soda lime glasses, borosilicate glasses such as E-glass, high-strength glasses such as S-glass, and E-type glasses with lower amounts of boron or boron-free glasses.

As used here, the term "boron/fluorine free" refers to glasses with low amounts or none of these two elements. A typical glass fiber used with the present size composition consists essentially of 59.0 to 62.0 wt. % $SiO_2$, 20.0 to 24.0 wt. % CaO, 12.0 to 15.0 wt. % $Al_2O_3$, 1.0 to 4.0 wt. % MgO, 0.0 to 0.5 wt. % $F_2$, 0.1 to 2.0 wt. % $Na_2O$, 0.0 to 0.9 wt. % $TiO_2$, 0.0 to 0.5 wt. % $Fe_2O_3$, 0.0 to 2.0 wt. % $K_2O$, and 0.0 to 0.5 wt. % $SO_3$. More preferably the $SiO_2$ content is about 60.1 wt. %, the CaO content is about 22.1 wt. %, the $Al_2O_3$ content is about 13.2 wt. %, the MgO content is about 3.0 wt. %, the $K_2O$ content is about 0.2 wt. %, the $Na_2O$ content is about 0.6 wt. %, the $Fe_2O_3$ content is about 0.2 wt. %, the combined content of $SO_3$ and $F_2$ content is about 0.1 wt. %, and the $TiO_2$ content is about 0.5 wt. %.

The reinforcing fiber material may be in the form of individual filaments, twisted yarns, strands or rovings. The sized reinforcing fiber material may be used in continuous or discontinuous form in the manufacture of fiber-reinforced composites. The term "continuous" as used herein with regard to the reinforcing fiber material is intended to include reinforcing fiber materials that are in the form of unbroken filaments, threads, strands, yarns or rovings and which may either be sized directly after formation in a continuous fiber-forming operation or which may be formed and wound into packages that can be unwound at a later time to allow application of the fiber size composition.

The term "discontinuous" as used herein with regard to the reinforcing fiber material is intended to include reinforcing fiber materials that have been segmented by chopping or cutting or which are formed from a process designed to form segmented fibers such as a fiber-forming spinner process. The segments of discontinuous reinforcing fiber material that are used in the present invention may have a generally uniform length, may be provided in a bimodal or other structured distribution of lengths, or may represent a more random distribution. The segments of the discontinuous reinforcing fiber material may be provided in a range of lengths, typically ranging from about 2 mm to about 25 mm, although some applications may utilize longer fibers Accordingly, the fiber size composition may be applied, for example, to continuous filaments of a reinforcing fiber material immediately after they are formed in an in-line operation, that is, as part of the filament formation process. Alternatively, the fiber size composition may be applied off-line to unwound strands of reinforcing fiber material that were previously formed and packaged. Also the strands may be cut or chopped in an off-line process. Means for applying the fiber size composition include, but are not limited to, pads, sprayers, rollers or immersion baths, which allow a substantial amount of the surfaces of the filaments of the reinforcing fiber material to be wetted with the fiber size composition.

Preferably, the fiber size composition is applied to a plurality of continuously forming filaments of a reinforcing fiber material as soon as they are formed from a fiber-forming apparatus such as a bushing. The bushing is preferably equipped with small apertures to allow passage of thin streams of a molten reinforcing fiber material. As the streams of molten material emerge from the bushing apertures, each stream is attenuated and pulled downward to form a long, continuous filament. After the filament formation process which includes the application of the fiber size composition, the continuously forming filaments may then be gathered into strands and chopped or cut in an in-line operation, or they may be gathered into strands for winding into forming packages or doffs after which they may be optionally chopped in an off-line operation. The chopped strands or the forming packages are then dried. Typically, chopped strands are dried in an oven using a temperature ranging from about 50° C. to about 300° C. Typically, forming packages are dried, for example, in a static oven for a period of about 3 hours to about 30 hours at a temperature of about 100- about 150° C. after which they are ready for use in composite-making operations. Of course, any other drying techniques functioning at lower or higher temperatures based on different technologies can be used. The glass-fiber composition is typically applied to the fiber in an amount to give about 0.01 to about 10 wt. % dry solids, preferably in an amount of about 0.03 to about 7 wt. % dry solids and most preferably in an amount of about 0.1 to about 4 wt. % dry solids based on the total weight of dry solids of the fiber size composition and the glass fibers.

The resulting sized reinforcing fiber material may be utilized to form a composite material having substantially no discoloration due primarily to the use of the non-discoloring fiber size composition of the present invention deposited on the fibers. Suitable matrix resins for this purpose may be thermoplastic polymers, thermoset polymers, solution processable polymers, aqueous based polymers, monomers, oligomers, and polymers curable by air, heat, light, x-rays, gamma rays, microwave radiation, dielectric heating, UV radiation, infrared radiation, corona discharge, electron beams, and other similar forms of electromagnetic radiation. Suitable matrix resins include, but are not limited to, polyolefins, modified polyolefins, saturated or unsaturated polyesters, polyacetals, polyamides, polyacrylamides, polyimides, polyethers, polyvinylethers, polystyrenes, polyoxides, polycarbonates, polysiloxanes, polysulfones, polyanhydrides, polyiminesepoxies, polyacrylics, polyvinylesters, polyurethanes, maleic resins, urea resins, melamine resins, phenol resins, furan resins polymer blends, polymer alloys and their mixtures.

Preferably, the matrix resin is a polyolefin. Polyolefins can be homopolymers, copopolymers, and may or may not contain impact modifiers. One example of such a polyolefin is a polypropylene homopolymer commercially available as MOPLEN HF 1078 from Basell Polypropylene GmbH in Mainz, Germany. During the compounding process, the composite formulation may also include one or more conventionally known additives such as coupling agents, compatibilizers, adhesion promoters, flame retardants, pigments, antioxidants, lubricants, antistats and fillers all mostly in solid forms at room temperature. A suitable commercially available antioxidant used during the compounding process is the product marketed under the trade name HP2215 from Ciba Specialty Chemicals Inc., Basel, Switzerland. A coupling agent such as PB 3200 (a maleic anhydride grafted polypropylene) is available from Uniroyal (Crompton), Taft, La. Typically the additives are applied in amounts of from about 0.1 wt. % to about 10 wt. % of the total weight of sized reinforcing fiber and matrix resin, preferably about 0.2 wt. % to about 7.5 wt. %, and most preferred from about 0.25 wt. % to about 5 wt. %.

The process of compounding and molding the sized reinforcing fiber material and the matrix resin to form a composite may be accomplished by any means conventionally known in the art. Such compounding and molding means include, but are not limited to, extrusion, wire coating, compression molding, injection molding, extrusion-compression molding, extrusion-injection-compression molding, long fiber injection, pulltrusion and pushtrusion. In a preferred embodiment of the present invention, when using polyolefin composites, the chopped fiber strand is coated with the fiber size composition and is extruded with polyolefin resin matrix to form pellets. These chopped pellets then are suitably injection molded into a desired composite article.

The amount of matrix resin included in the composite is generally about 10 to about 99 wt. %, based on the total weight of the composite formulation. Preferably, the percent composition of matrix resin is between about 30 and about 95 wt. %. Most preferable is about 50 to about 90 wt. %, based on the total weight of the composite.

The fiber size composition of the present invention provides a coating on the reinforcing fibers that improves compatibility and adhesion with the resin matrix, and results in composites with more desirable properties such as higher short-term and long-term mechanical performance, and increased resistance to chemicals, detergents, oxidation, and hydrolysis. Although the mechanism is not fully understood, in composites it is generally observed that the chemicals, detergents, and water that attack the matrix resin and other ingredients present in the composite formulation also attack the glass-matrix inter-phase region that is responsible for the composite performance thus lowering the adhesion and the composite performance.

Where a specific coloration of the final composite product is desired, pigments or other color-enhancing additives may be added to the composite formulation before or during the molding process. Additionally, it may be desired that the composite formulation not contain any inherent discoloration that could affect the desired color of the molded composite product. Therefore, it is desirable that the composite have a clear or neutral coloration. In other applications, it may be preferable that the composite formulation be white, in which case a white pigment may be added. In preparing white composite formulations, it is also desirable that the origins to discoloration of the composite be kept to a minimum.

The fiber size composition disclosed above may suitably comprise, consist of, or consist essentially of an emulsion comprising a modified polyolefin, a hydrophilic coupling agent, a blend of at least two fatty acids, a boron-, fluorine-fluoro-boro containing compound, a phosphorus(V) and/or a sulfur(VI) compound. Other conventional additives, preferably those having very low Iodine Value, such as antistatic agents, colorants, antifoaming agents, etc., may also be included in the composition. The fiber size composition according to the invention will include a modified polyolefin, a hydrophilic coupling agent and at least one size enhancing compounds selected from a group consisting of fatty acids, cyclic fatty acid, fatty dimer diacids, boron-containing compounds, fluorine-containing compounds, fluoro-boro containing compounds, hydrophobic coupling agents, phosphorus(V) compounds and sulfur(VI) compounds while being substantially free of conventional antioxidants including P(III) and S(IV) compounds.

When the blend of at least two fatty acids, preferably at least two saturated fatty acids in which at least one of the fatty acids includes at least two acid groups is used, the fiber size composition may comprise, consist of, or consist essentially of, an aqueous emulsion of the modified polyolefin, an aminosilane coupling agent, a fluorine containing compound, boron-containing and/or a fluoro-boro containing compounds, the blend of fatty acids and a phosphorus(V) and/or a sulfur(VI) compound. The size composition may also be substantially free of conventional antioxidants including such as phosphorus(III) and/or sulfur(IV) compounds including, for example, phosphinates, phosphonites, phosphites, hypophosphites, sulfites and bisulfites.

The fiber size composition may also include an emulsifier, a base and other conventional additives such as wetting agents, lubricants, color enhancing or compensating reagents, viscosity adjusters, stabilizers, acids and other bases, etc. As will be appreciated by those skilled in the art, the fiber size compositions, formulations including fibers sized with such compositions and composite materials incorporating such formulations according to the present invention may be practiced in a variety of embodiments and methods not explicitly disclosed herein by modifying the basic compositions and methods in accord with the principles outlined herein. In particular, the concentrations and constituents of the various examples provided below may be combined and altered within the general compositional parameters to provide a large variety of size compositions in accord with the present invention.

The following examples are demonstrative and representative, but should not be considered or interpreted as limiting the scope of the invention defined by the claims.

EXAMPLES

In the following discussion, Part A is directed to the composition of a comparative size composition and a series of exemplary size compositions according to the present invention. Part B is directed to the preparation of comparative and exemplary extrusion compounding formulations based on the size compositions prepared in Part A. Part C is directed to examples and testing of comparative and exemplary composite compositions prepared from the extrusion compounding formulations prepared in Part B.

A comparative fiber size composition C1 and exemplary fiber size composition according to the present invention, S1-S31, were prepared according to the formulations listed in TABLE 1 below:

TABLE 1

| Exemplary Size Formulations Component | Modified Polyolefin[2] 35%, but for S2-S6 & S14 = 30% | Polyurethane[3] (40.6%) | Hydrophilic Coupler[4] A-1100 | A Link-15 | Hydrophobic Coupler[6] Propyltrialkoxy silane | Cyclic Fatty Acid[7] Pripol 1025 or Empol 1008 | Saturated Fatty Acids[8] (20%) | Fluorine Enhancer[5] S9 = KAlF$_4$, S10 = KZrF$_6$ & S11 = NaF | NaBF$_4$, but for S8 = KBF$_4$ | Boron-Fluorine Enhancers[16] NH$_4$BF$_4$, but for S20 = HBF$_4$ (48%) |
|---|---|---|---|---|---|---|---|---|---|---|
| C1[1] | 40.71 | | 5.70 | | | | 15.20 | | | |
| S1 | 40.59 | | 4.55 | | | 2.46 | | | 0.55 | |
| S2 | 33.66 | | 3.20 | | 2.00 | 2.48 | | | 0.55 | |
| S3a | 33.66 | | | 3.30 | 2.50 | | | | | |
| S3b | 33.66 | | | 3.30 | 2.50 | | | | 0.60 | |
| S4 | 33.66 | | 2.50 | 2.50 | | | | | 0.60 | |
| S5 | 33.66 | | 2.50 | | 2.50 | | | | | |
| S5a | 33.66 | | 2.50 | | 2.50 | | | | | |
| S5b | 33.66 | | 2.50 | | 2.50 | | | | 0.60 | |
| S5c | 33.66 | | 2.50 | | 2.50 | | | | 0.60 | |
| S6 | 33.66 | 5.00 | 2.50 | | 2.50 | | | | 0.46 | |
| S7 | 43.00 | | 6.03 | | | | 16.04 | | 0.55 | |
| S8 | 40.59 | | 5.69 | | | | 15.15 | | 0.55 | |
| S9 | 40.59 | | 5.69 | | | | 15.15 | 0.55 | | |
| S10 | 40.59 | | 5.69 | | | | 15.15 | 0.55 | | |
| S11 | 40.59 | | 5.69 | | | | 15.15 | 0.55 | | |
| S12 | 40.59 | | 5.69 | | | | 15.15 | | | |
| S13 | 40.59 | | 5.69 | | | | 15.15 | | | |
| S14 | 47.36 | | 5.69 | | | | 15.15 | | 0.55 | |
| S15 | 43.00 | | 5.69 | | | | 16.04 | | 0.55 | 0.56 |
| S16 | 40.59 | | 5.69 | | | | 15.15 | | | 0.52 |
| S17 | 43.00 | | 5.69 | | | | 16.04 | | 0.55 | |
| S18 | 40.59 | | 5.69 | | | | 15.15 | | | |
| S19 | 43.00 | | 5.69 | | | | 16.04 | | 0.55 | |
| S20 | 40.59 | | 5.69 | | | | 15.15 | | | 2.17 |
| S21 | 43.00 | | 5.69 | | | | 15.15 | | | 0.58 |
| S22 | 43.00 | | 5.69 | | | | 16.04 | | 0.55 | |
| S23 | 43.00 | | 5.69 | | | | 16.04 | | 0.55 | |
| S24 | 43.00 | | 5.69 | | | | 15.15 | | | 0.75 |
| S25 | 43.00 | | 5.69 | | | | 15.15 | | | 0.75 |
| S26 | 43.00 | | 5.69 | | | | 15.15 | | | 1.54 |
| S28 | 43.00 | | 5.69 | | | | 16.04 | | 0.55 | |
| S29 | 43.00 | | 5.69 | | | | 15.15 | | | 0.68 |
| S30 | 43.00 | | 5.69 | | | | 15.15 | | | 0.68 |
| S31 | 43.00 | | 5.69 | | | | 15.15 | 0.50 | | |

| Exemplary Size Formulations Component | Boron Enhancer[9] Na$_2$B$_4$O$_7$, but for S13 = H$_3$BO$_3$ | P(V) or S(VI) Enhancer[10] H$_3$PO$_4$ | NaH$_2$PO$_4$, but S29 = Na$_2$HPO$_4$ | NH$_4$H$_2$PO$_4$, but S19 = (NH$_4$)$_2$HPO$_4$ | Antioxidant[15] NaH$_2$PO$_2$ | Wetting Agent[11] | Lubricant[12] | Surfactant[13] | Antifoam[14] | Demineralized Water |
|---|---|---|---|---|---|---|---|---|---|---|
| C1[1] | | | | | | | | | 0.05 | 306.70 |
| S1 | | | | | 1.20 | 1.96 | 0.82 | 0.92 | 0.10 | 399.60 |
| S2 | | | | | 1.20 | 1.97 | 0.83 | 0.93 | 0.10 | 336.60 |
| S3a | | | | | 1.20 | 1.97 | 2.68 | 0.93 | 0.10 | 378.80 |
| S3b | | | | | 1.20 | 1.97 | 2.68 | 0.93 | 0.10 | 390.10 |
| S4 | | | | | 1.20 | 1.99 | 2.71 | 0.94 | 0.10 | 373.00 |
| S5 | | | | | | 1.98 | 2.70 | 0.93 | 0.10 | 335.30 |
| S5a | | | | | 1.20 | 1.97 | 2.69 | 0.93 | 0.10 | 357.74 |
| S5b | | | | | 1.20 | 1.97 | 2.69 | 0.93 | 0.10 | 373.00 |
| S5c | | | | | 0.60 | 1.97 | 2.69 | 0.93 | 0.10 | 357.72 |
| S6 | | | | | 0.46 | 1.55 | | 0.90 | 0.10 | 287.10 |
| S7 | | | | | | | | | 0.09 | 333.54 |
| S8 | | | | | | | | | 0.09 | 315.40 |
| S9 | | | | | | | | | 0.09 | 315.40 |
| S10 | | | | | | | | | 0.09 | 315.40 |

TABLE 1-continued

| | | | | | | |
|---|---|---|---|---|---|---|
| S11 | | | | | 0.09 | 315.40 |
| S12 | 0.55 | | | | 0.09 | 315.40 |
| S13 | 0.55 | | | | 0.09 | 315.40 |
| S14 | | | | | 0.09 | 308.63 |
| S15 | | | | | 0.09 | 340.26 |
| S16 | | | | | 0.09 | 314.88 |
| S17 | 1.68 | | | | 0.09 | 354.88 |
| S18 | 1.04 | | | | 0.09 | 320.98 |
| S19 | | | 1.12 | | 0.09 | 349.84 |
| S20 | | | | | 0.09 | 322.69 |
| S21 | 1.68 | | | | 0.09 | 345.53 |
| S22 | 1.68 | | | | 0.09 | 347.35 |
| S23 | 1.68 | | | | | 347.16 |
| S24 | 1.55 | | | | | 346.47 |
| S25 | | | 1.50 | | | 349.78 |
| S26 | | | | | | 337.81 |
| S28 | 1.03 | | | | | 338.02 |
| S29 | | 1.45 | | | | 347.76 |
| S30 | | | | | | 323.32 |
| S31 | | 3.25 | | | | 375.07 |

TABLE 1 REMARKS:
[1]C1 is a comparative example.
[2]Modified polypropylene emulsions with 30 or 35 wt % active solids.
[3]Polyurethane RSC 396 (40.6%) from Bayer AG, Waldsaal, Germany.
[4]A-1100 γ-aminopropyltriethoxysilane from GE [Osi] Silicones, Wilton, Connecticut, United States of America. Silquest A-Link 15 Ethylaminosec-butyltriethyloxysilane from GE [Osi] Silicones, Wilton, Connecticut, United States of America.
[5]Fluorine Enhancer: NaF: Sodium Fluoride; KAlF4: Potassium tertrafluoroaluminate; KZrF$_6$: Potassium hexafluorozirconate all from Honeywell Specialty Chemicals, Seelze, Germany.
[6]Propyltriethoxysilane; Propyltrimethoxysilane both from Aldrich Chemical, Milwaukee, Wisconsin, United States of America.
[7]Pripol 1025 (100%) from Uniqema, Wilmington Delaware, United States of America or Empol 1008 (100%) from Cognis Corp, Cincinnati, Ohio, United States of America.
[8]Moldpro 1327-LA4 (20%); a mixture of saturated fatty acids from Witco Polymer Additives, a subsidiary of Crompton Corp., Memphis, Tennessee, United States of America.
[9]Boron Enhanncer: Disodium tetraborate decahydrate (Na$_2$B$_4$O$_7$.10H$_2$0) and Boric acid (H$_3$BO$_3$) both from Aldrich Chemical, Milwaukee, Wisconsin, United States of America.
[10]P(V) or S(VI) Enhancer: OrthoPhosphoric acid (85%), H$_3$PO$_4$; Sodium Dihydrogenphosphate monohydrate, NaH$_2$PO$_4$.H$_2$O; Disodium Hydrogenphosphate dihydrate, Na$_2$HPO$_4$.2H$_2$O; Ammonium Dihydrogenphosphate, NH$_4$H$_2$PO$_4$; Diammonium Hydrogenphosphate (NH$_4$)$_2$HPO$_4$ from Aldrich Chemical, Milwaukee, Wisconsin, United States of America.
[11]Rewopol SBDO 75 (75%) Diisooctylsulfosuccinate from Rewo Chemische Werke GmbH, Germany.
[12]S1, S2, S3a, S3b, S4, S5, S5a, S5b, S5c: Polyaldo 10-1-S (100%) decaglycerol monosterate; S3a, S3b, S4, S5, S5a, S5b, S5c: Glycolube 674 (100%) ethylene glycol distearate; both from Lonza Inc., Fair Lawn, New Jersey, United States of America. Weight ratios of Polyaldo 10-1-S: Glycolbue 674 in S3a, S3b, S4, S5, S5a, S5b, S5c is for S3a: 1.609:1.072; for S3b: 1.647:1.03; for S4: 1.668:1.043; for S5: 1.659:1.037; for S5a, S5b, S5c: 1.6532:1.0333
[13]Lutensol ON60 (100%) Ethoxylated Fatty Alcohol from BASF, Ludwigshafen, Germany.
[14]BYK 024 (17%) a mixture of foam-destroying hydrophobic solid-polysiloxanes in polyglycol from BYK-Chemie, Wesel, Germany.
[15]Antioxidant, e.g., Sodium Hypophosphite Monohydrate (NaH$_2$PO$_2$.H$_2$0) from Aldrich Chemical, Milwaukee, Wisconsin, United States of America.
[16]Boron-Fluorine Enhancer: SodiumTertafluoroborate, NaBF$_4$; PotassiumTetrafluoroborate, KBF$_4$; AmmoniumTetrafluoroborate, NH$_4$BF$_4$; Tetrafluoroboric acid, HBF$_4$; all from Honeywell Specialty Chemicals, Seelze, Germany.
[17]S21-S26, S28-31 at 5.6% solids; S3a, S3b, S4, S5, S5a, S5b, S5c at 5% solids; C1, S1, S2, S6-S20 at 5.5% solids.
[18]All size formulation ingredients are given as received.

The fiber size compositions according to the invention can be applied to the fibers by any method known in the art, either shortly after the initial forming of the fibers or during a subsequent process. In the given examples, each size composition was applied to glass fiber or strands using a submerged applicator roller process. In this process, the fibers pick up the fiber size composition during their production by making contact with the surface of a rotating applicator which is submerged in a circulating bath of fiber size composition. Therefore, the fiber size composition is applied to the fibers during the continuous fiber production, often referred to as an in-line process. The amount of fiber size composition that is picked up by the fibers from the surface of the rotating applicator can be influenced by several factors such as speed of the applicator roll, concentration of the fiber size composition, and the amount of water sprayed during the fiber production. In an in-line process, the fiber size composition can be applied to fibers having a wide range of diameters, but the diameter range of 9-27 μm is considered suitable for many applications.

Next in the production process, the fibers are gathered to form a strand that is chopped into strands using an in-line chopping process called the Cratec® process, as named by Owens Corning. During this process, the glass fibers are chopped in-line using a chopper and cot during their manufacturing. The chopped length of the strand may be varied from about 2 mm to 25 mm. The preferred range of the chopped strand length is from 2.5 mm to 13 mm. The most preferred range of the chopped length is from 3 mm to 4.5 mm. The most preferred range of the length is also suitable for high shear extrusion processes. The chopped strands are then conveyed over the belt to the drying oven to solidify the fiber size composition on the glass fibers.

Before drying, chopped strands may optionally be sent through the Cratec Plus® process, as named by Owens Corning, to form strand bundles of a size that are suitable for further handling and processing. The Cratec Plus® process is an extension of the Cratec® process in which the glass fibers are chopped in-line using the Cratec® process, then processed in-line in a tumbler to produce strand bundles larger than those obtained with the Cratec® process. The Cratec® and Cratec Plus® processes and related processes are described for example, in U.S. Pat. Nos. 5,578,535, 5,693,378, 5,868,982, and 5,945,134, each is incorporated by reference. In the drying oven, the chopped strands are dried and the fiber size composition on the fibers is solidified using hot air flow of controlled temperature. The dried fibers are then passed over screens to remove longs, fuzz balls, and other undesirable matter to finally collect the chopped strands in a more desirable form.

In the embodiments of TABLE 2, 30 wt. % dried chopped strands are combined with approximately 68 wt. % polypropylene matrix resin, in a twin-screw extruder of type ZSK 30/2 from Werner & Pfleiderer, to form compounded pellets. During the extrusion compounding, a coupling agent such as POLYBOND PB 3200 from Uniroyal, may optionally be combined and mixed with the polymer matrix resin as an additive. Such a coupling agent can be mixed during compounding with the resin matrix using 0.1% to 10% coupling agent by weight, based on the total weight of the glass and matrix resin, preferably 0.3% to 5%, and most preferably 0.5% to 3 wt. %.

Also, during the extrusion compounding, various types of antioxidants such as phenolic, phosphite, or lactone based, may be combined and mixed with the matrix resin for optimum performance of the composite. Such antioxidants may be formulated using about 0.1% to about 3% antioxidant by weight based on the total weight of the mixture of glass and matrix resin, preferably about 0.3% to about 2% (by weight), and most preferably about 0.5% to about 1% (by weight). Antioxidants such as HP 2215 and HP 2225 from Ciba Specialty Chemicals may be used in the compounding formulations because these antioxidants are based on combinations of phenolic, phosphite, and lactone based antioxidants, thereby offering a more balanced effect in controlling the thermal degradation, especially during the processing. Optionally, to pigment the pellets, a color compensating additive such as ZnS (a white pigment available commercially under the trade name "SACHTOLITH HDS" from Sachtleben Chemie) may be mixed with matrix resin in the range of 0.05% to 10% pigment by weight based on the total weight of the mixture of glass and matrix resin, preferably about 0.1% to about 5% (by weight), and most preferably about 0.5% to about 3% (by weight).

In this instance, the fiber size compositions reflected above in TABLE 1 were used to prepare corresponding chopped strand fibers according to the general procedures outlined above. These chopped strands were then extrusion compounded according to the compounding formulations listed below in TABLE 2.

each sample of the extrusion compounded pellets of TABLE 2 was further molded into composite test pieces by standard injection molding. Therefore, all the final injection molded composite pieces are identified using the same number and nomenclature as detailed above with regard to TABLE 2.

Testing:

The resulting composite parts were then tested to measure certain physical characteristics, including Tensile strength and Charpy impact strength. The parts were also tested to simulate long term aging by testing the parts for resistance to hydrolysis and/or detergents. Similarly plaques were molded for color measurement before and after heat aging. The results of the various tests are reported below in TABLE 3A.

Mechanical Performance:

Short Term and Long Term Aging Properties:

Test results reported in TABLE 3A are the measurement of mechanical performance including, for example, Tensile strength and Charpy Unnotched (ChUnn) impact strength for the indicated composite molded pieces. The testing was conducted with both freshly molded (Dry As Moloded or DAM) samples and aged samples that had been exposed to a water bath maintained at 95° C. for 20 days (also referred to as Hydro Aging).

Tensile strength is a measure of resistance when an elongating force is applied, and was measured using a universal testing machine from Zwick, according to ISO method 3268, and the results reported in MPa. Impact testing, resistance to crack propagation, was carried out using impact testing machine from Zwick. Charpy strength is also a measure of impact strength and was measured as resistance in $kJ/m^2$. Charpy strength is measured according to ISO Method 179/D method.

As indicated above, tensile strength testing was performed also on the examples after they had been subjected to hydrolytic and detergent conditions. These conditions were intended to simulate hydrolysis and detergent aging conditions that may be deteriorating the composite part performance in actual applications like a laundry or washing machine tub composite or dish washer composite parts. In such a situation, wet strength absolute values and the maximum % retention of the properties of the composite over an extended period of time at elevated temperature is desirable. To approximate conditions to test hydrolysis or detergent

TABLE 2

Extrusion Compounding Formulations using Chopped Fibers with Exemplary Size Compositions

| Extrusion Compounded Pellets | Chopped Strand length Glass Fiber Type 30% by weight | Polypropylene Matrix Resin 67.8% by weight | Coupling Agent 1.2% by weight | Antioxidant 1.0% by weight |
|---|---|---|---|---|
| C1, S1, S2, S3a, S3b, S4, S5, S5a, S5b, S5c, S6-S31 | 4-4.5 mm | HF1078 | PB 3200 | HP 2215 |

REMARKS:
1) The letter and number refer to the size composition applied to the fiber; the nomenclature used for the sized fiber is also used for the extrusion compounded pellets and the injection molded test samples used for testing.
3) HF 1078: Moplen HF 1078 homopolymer polypropylene matrix resin available from Basell Polyolefins.
4) PB 3200: Coupling agent commercially available from Uniroyal (Crompton).
5) HP2215: Antioxidant HP2215 commercial grade available from Ciba Specialty Chemicals.

Subsequently, pellets of the extrusion compounding formulations are fed into any suitable standard molding equipment to form the composite parts. In one embodiment of the present invention, molding was conducted using a Demag D80 injection molding machine (available from Demag Hamilton Plastics Ltd.) to produce composite test samples which were used to measure composite performance. Thus, aging resistance, samples of each composite that were molded according to the formulation of the demonstrative examples and the comparative examples were immersed in a waterbath maintained at a temperature of about 95° C. (203° F.) for up to 20 or 30 days. In the case of detergent resistance, the waterbath contained 1% detergent with the detergent solution being changed every day.

Similarly, for the preparation of samples to measure hydrolysis aging resistance, the samples of each composite test pieces were immersed in water bath that is maintained at a temperature of about 95° C. (203° F.). In both detergent and hydrolysis testing, the samples were removed after 20 days, at which time the tensile strength of each sample was measured. The results of these tests are recorded in TABLES 3A.

Equipment:

Instron 1331 servohydraulic testing machine with clamps in a Thermotron environmental chamber to condition molded specimens at 80° C. (176° F.). Testing controlled by an IBM compatible PC running Instron MAX software.

Method:

Tensile creep is measured by placing a 0.5 inch (1.27 cm) taper molded bar in an Instron 1331 servohydraulic machine, in load control, using a fixed mean level of 120 kg, and an amplitude of zero. The elevated temperature is 80° C. (176° F.). Failure time (hours to creep rupture) were averaged for three specimens.

Fatigue is measured by placing specimen in the Instron servohydraulic machine, in load control, using a sinusoidal wave form. The ratio of minimum to maximum stress on each cycle is 0.05. The test frequency is 6 Hz. Three stress levels were often chosen, 8400, 8900, and 10,000 psi. For the composite pieces of the present invention, a load of 8400 psi (about 57.92 MPa) is used. The cycles to failure were averaged for three specimens.

TABLE 3A

| Fiber Product | Tensile DAM (MPa) | Tensile Hydro (MPa) | ChUnn DAM (kJ/m2) | ChUnn Hydro Aged (kJ/m2) |
|---|---|---|---|---|
| C1 | 86.31 | 75.93 | 46.57 | 27.70 |
| S1 | 92.47 | 79.99 | 53.11 | 26.66 |
| S2 | 90.90 | 79.78 | 51.20 | 27.82 |
| S3a | 92.22 | 70.98 | 44.60 | 16.88 |
| S3b | 93.32 | 76.19 | 46.35 | 20.54 |
| S4 | 95.71 | 75.60 | 48.74 | 19.95 |
| S5 | 92.55 | 67.81 | 44.81 | 17.94 |
| S5a | 93.01 | 72.51 | 49.61 | 20.93 |
| S5b | 92.12 | 79.43 | 48.34 | 24.57 |
| S5c | 94.16 | 77.13 | 47.31 | 19.67 |
| S6 | 91.84 | 75.85 | 42.57 | 18.57 |
| S7 | 96.27 | 83.00 | 51.36 | 29.14 |
| S8 | 94.30 | 86.25 | 50.42 | 32.36 |
| S9 | 94.46 | 82.74 | 48.87 | 29.20 |
| S10 | 92.59 | 82.88 | 51.14 | 29.71 |
| S11 | 93.07 | 82.15 | 51.20 | 29.50 |
| S12 | 92.71 | 81.42 | 51.53 | 26.86 |
| S13 | 92.79 | 80.51 | 51.70 | 26.12 |
| S14 | 94.35 | 81.10 | 50.51 | 25.88 |
| S15 | 99.10 | 86.88 | 47.93 | 30.07 |
| S16 | 99.50 | 91.81 | 50.48 | 37.51 |
| S17 | 95.72 | 85.23 | 48.32 | 29.78 |
| S18 | 94.81 | 84.16 | 48.09 | 32.67 |
| S19 | 96.44 | 84.97 | 48.49 | 30.03 |
| S20 | 95.86 | 89.22 | 49.17 | 32.39 |
| S21 | 92.22 | 83.58 | 46.99 | 29.06 |
| S22 | 92.49 | 84.85 | 47.22 | 30.75 |
| S23 | 94.25 | 86.82 | 46.36 | 31.87 |
| S24 | 93.08 | 87.12 | 45.19 | 31.19 |
| S25 | 92.71 | 84.65 | 46.49 | 28.74 |
| S26 | 94.63 | 91.35 | 47.19 | 34.87 |
| S28 | 96.88 | 88.48 | 49.64 | 33.40 |
| S29 | 97.06 | 87.43 | 50.70 | 32.58 |
| S30 | 95.15 | 90.52 | 49.89 | 34.77 |
| S31 | 96.70 | 84.78 | 50.84 | 27.56 |

As reflected in Table 3A, the inventive size compositions exhibited comparable or improved mechanical properties relative to the comparative sample reported in C1. Similarly, a two- to three-fold increase in the Fatigue and Creep performance improvement over the comparative sample was observed.

Color Stability

The color of the composite samples was quantified using a Minolta CIELab color meter equipped with ChromaControll software. When measuring color, the standard molded pieces in plaques or disc shape were used. Color was determined in terms of whiteness (reported as an "L" value), red-green coloration (an "a*" value, not reported), blue-yellow coloration (reported as a "b*" value) and Yellow Index (reported as "YI") Higher "L" values indicate a whiter or lighter coloring of the test piece with higher reflectance. A higher positive "a*" value indicates more red is detected in the test piece, and a higher negative "a*" value indicates more green is detected in the test piece.

Similarly, a higher positive "b*" value indicates more yellow has been detected in the test piece, and a higher negative "b*" value indicates that more blue has been detected in the test piece. Consequently, a higher YI values mean more yellow color. In order to achieve whiteness or to match any color, color compensating additives are commonly added. However, such compensating additives lead to complex color formation, making it very difficult, time consuming and costly to match the color of the final composite part. For example, to hide or mask the yellow color of a part having high "b*" value, compensating blue color using a bluing agent may be added to shift the "b*" values to a lower value. The bluing agent may also change the original "a*" value resulting in an undesirable coloration. Such color compensating additives are not necessary, but may be used with the present invention.

In the case of non-pigmented extrusion compounding formulations, each of the exemplary composites, for both freshly molded as well as Heat Aged (150° C. for 24 hours) samples, were compared to comparative composite samples C1. The results of the testing are reported below in TABLE 3B.

TABLE 3B

| Fiber Product | Color DAM b* | Color DAM YI | Color Heat Aged Δb* | Color Heat Aged ΔYI |
|---|---|---|---|---|
| C1 | 4.51 | 11.77 | 3.31 | 7.34 |
| S1 | 2.55 | 4.72 | 1.88 | 2.65 |
| S2 | 2.99 | 6.00 | 3.43 | 6.12 |
| S3a | 3.04 | 5.17 | 2.34 | 5.60 |
| S3b | 2.33 | 3.18 | 1.76 | 3.82 |
| S4 | 2.94 | 5.16 | 2.20 | 5.05 |
| S5 | 3.76 | 6.83 | 1.93 | 4.78 |
| S5a | 3.35 | 7.15 | 2.33 | 4.57 |
| S5b | 2.77 | 5.37 | 1.02 | 1.37 |
| S5c | 3.06 | 5.82 | 0.86 | 1.09 |
| S6 | 3.10 | 6.10 | 2.76 | 5.70 |
| S7 | 3.66 | 7.18 | 1.63 | 3.25 |
| S8 | 3.03 | 5.80 | 1.95 | 3.50 |
| S9 | 3.27 | 6.36 | 2.62 | 4.80 |
| S10 | 3.50 | 7.01 | 2.87 | 5.33 |
| S11 | 3.76 | 7.85 | 2.53 | 4.59 |
| S12 | 3.20 | 6.15 | 1.73 | 2.55 |
| S13 | 3.43 | 7.03 | 1.61 | 2.08 |
| S14 | 4.05 | 8.34 | 1.86 | 2.50 |
| S15 | 4.47 | 9.74 | 1.06 | 1.37 |
| S16 | 4.04 | 8.42 | 1.39 | 2.40 |
| S17 | 2.75 | 5.12 | 0.43 | 0.30 |
| S18 | 2.87 | 5.42 | 1.08 | 1.97 |
| S19 | 3.19 | 6.40 | 1.07 | 1.87 |
| S20 | 3.89 | 7.92 | 1.03 | 1.88 |
| S21 | 3.31 | 7.72 | 1.03 | 0.81 |
| S22 | 3.09 | 6.81 | 0.89 | 0.51 |
| S23 | 2.35 | 4.13 | 1.35 | 1.80 |
| S24 | 2.63 | 5.17 | 1.30 | 1.20 |
| S25 | 2.85 | 5.80 | 2.70 | 6.00 |

TABLE 3B-continued

| Fiber Product | Color DAM b* | Color DAM YI | Color Heat Aged Δb* | Color Heat Aged ΔYI |
|---|---|---|---|---|
| S26 | 3.49 | 7.47 | 2.31 | 5.05 |
| S28 | 2.50 | 3.60 | 0.64 | 0.36 |
| S29 | 2.36 | 2.56 | 2.87 | 5.52 |
| S30 | 3.21 | 4.80 | 1.30 | 1.65 |
| S31 | 2.27 | 2.62 | 0.86 | 0.70 |

Table 3B Remarks:
1) Hydro Aging was carried out for 20 days in a water bath maintained at 95° C. (203° F.).
2) DAM=Dry as Molded samples (meaning no specific treatment to the test pieces after molding).
3) Heat Aging was carried out for 24 hours in an oven at a temperature of 150° C.
4) Delta b*=difference in color b* between before and after heat aged samples.
5) Delta YI=difference in color YI between before and after heat aged samples.

As reflected in Table 3B, the inventive size compositions exhibited comparable or improved color stability properties relative to the comparative sample reported in C1.

As reflected above in TABLE 3B, for non-pigmented compounding formulations, the composites made with the fiber size composition of the present invention have higher "L", lower "b*" and YI values indicating more neutral coloring compared to the reference composite sample. TABLE 3B also shows the improved resistance to discoloration when compared to the comparative sample. In pigmented compounding formulations (not reported), the composites made with the fiber size composition of the present invention would be expected to exhibit improved whiteness compared to the reference composite sample.

As shown above in TABLE 3A, composites made using the fiber size composition of the present invention show better long-term aging properties than the reference composites. As is seen by the results, the composites made using the fiber size composition of the present invention have higher absolute values for initial strength and strength after accelerated aging in a water bath for 20 days when compared to the reference composite sample.

As a result of reviewing composite parts made using the fibers coated with fiber size composition of the present invention, offer better short-term mechanical properties, improved long-term mechanical properties, improved detergent and hydrolysis aging resistance, higher retention of initial strength after aging, and better color.

Summary of Results:

The examples of sizing formulations of the present invention show improvement in either one or more composite properties (mechanical, long-term mechanical, long-term aging, and/or color). Although not all combinations have been tried, the mentioned examples clearly demonstrate the advantages of the new sizing formulations based on the present invention. A further improvement would still be possible with other combinations.

As seen from TABLE 3B, those sizing formulations that contained fluorine containing compounds, e.g., S9 (with $KAlF_4$), S10 (with $KZrF_6$), S11 (with NaF) show better composite properties than the comparative sample C1.

Similarly, the sizing formulations incorporating boron-fluorine containing compounds, e.g., S7, S14, (all with $NaBF_4$ alone); S1, S2, S3b, S4, S5b, S5c, S6 (all with $NaBF_4$ and $NaH_2PO_2$); S15 (with $NaBF_4$ and $NH_4BF_4$); S17, S22, S23, S28 (all with $NaBF_4$ and $H_3PO_4$); S19 (with $NaBF_4$ and $(NH_4)_2HPO_4$); S8 (with $KBF_4$); S16, S26, S30 (all with $NH_4BF_4$ alone); S21, S24 (all with $NH_4BF_4$ and $H_3PO_4$); S25 (with $NH_4BF_4$ and $NH_4H_2PO_4$); S29 (with $NH_4BF_4$ and $Na_2HPO_4$); S31 (with $NaBF_4$ and $NaH_2PO_4$); S20 (with $HBF_4$ alone), show improved composite properties relative to the comparative sample C1.

Further, all the sizing formulations that contained P(V) or S(VI) containing compounds e.g. S18 (with $H_3PO_4$ alone); S17, S22, S23, S28 (all with $H_3PO_4$ and $NaBF_4$); S21, S24 (all with $H_3PO_4$ and $NH_4BF_4$); S19 (all with $(NH_4)_2HPO_4$ and $NaBF_4$); S31 (with $NaH_2PO_4$ and $NaBF_4$); S29 (with $Na_2HPO_4$ and $NH_4BF_4$); S25 (with $NH_4H_2PO_4$ and $NH_4BF_4$) show enhanced composite properties relative to the comparative sample C1.

Moreover, all the sizing formulations that contained boron containing compounds, e.g., S12 (with $Na_2B_4O_7$) and S13 (with $H_3BO_3$) show better composite properties than the comparative sample C1.

It was also shown that when a conventional antioxidant was present (samples S3a and S5a) some improvement over the comparative samples S5 was seen. However, the presence of a boron or boron-fluorine compound (S3b and S5b) brought a significant improvement over the samples S5 that contained no conventional antioxidant and also over the samples S3a and S5a, that already contained conventional antioxidant. It was clearly shown that the presence of boron or boron-fluorine compounds demonstrated excellent performance also in the absence of the conventional antioxidant. Moreover, the presence of boron or boron-fluorine compounds were not affected by the presence of the conventional antioxidants and thus either did not require the presence of conventional antioxidants and/or they did work in synergy when conventional antioxidant was present.

Addition of a polyurethane film former to the sizing (e.g., S6) gave improved properties compared to S5 and similar to S3b, S4, S5b, S5a. The addition of polyurethane also improved the strand integrity over S3b, S4, S5b, S5a and S5. The addition of a cyclic fatty acid, e.g., in S1 and S2 also tended to provide a size composition that exhibited improved properties, particularly with respect to hydro-aging retention and impact properties, compared to C1, S3a, S3b, S4, S5a, S5b, S5c and S5.

Generally, it has been shown that various size composition additives such as fluorine-containing compounds, hydrophilic as well as hydrophobic coupling agents, cyclic fatty acid, fatty acid dimers, antioxidants, boron-containing compounds, fluoro-boro containing compounds, P(V) and/or S(VI) compounds and polyurethane improve the strength, color parameters and processing parameters of E-glass including boron/fluorine-free glass fibers as used in the strengthening of composite article formulations.

Although the invention has been described in connection with certain exemplary embodiments, it will be evident to those of ordinary skill in the art that many alternatives, modifications, and variations may be made to the disclosed size compositions in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein explicitly described, embodiments incorporating the claimed invention but more closely adapted for an intended use or performance requirements. Accordingly, it is intended that all such alternatives, modifications and variations that fall within the spirit of the invention are encompassed within the scope of the appended claims.

We claim:

1. A fiber size composition comprising:
   1) a modified polyolefin;
   2) a hydrophilic coupling agent;
   3) two or more size enhancing compounds selected from the group consisting of
      a) one or more fatty acids selected from the group consisting of cyclic fatty acids and fatty dimer diacids;
      b) boron compounds;
      c) one or more fluorine compound selected from alkali metal fluorides, alkali metal tetrafluoroaluminates, alkali metal hexafluorozirconates and hexafluorosilicates;
      d) fluoro-boro compounds; and
      e) hydrophobic coupling agents; and
   4) an additive selected from sulfur(VI) compounds alone or in combination with a member selected from the group consisting of P(III) compounds, P(V) compounds and a mixture of P(III) compounds and P(V) compounds.

2. The fiber size composition according to claim 1, wherein:
   the fiber size composition is an aqueous emulsion.

3. The fiber size composition according to claim 1 wherein:
   the modified polyolefin is a nonionic aqueous polymer emulsion, the modified polyolefin being modified by the addition of a substituent selected from the group consisting of maleic acid, acrylic acid, methacrylic acid, maleic anhydride, acrylic anhydride, methacrylic anhydride and oxiranes.

4. The fiber size composition according to claim 3 wherein:
   the modified polyolefin is a maleic anhydride modified polypropylene having a molecular weight of at least about 10,000.

5. The fiber size composition according to claim 3 wherein:
   the modified polyolefin is a maleic anhydride modified polypropylene having a molecular weight of at least about 80,000.

6. The fiber size composition according to claim 1, wherein:
   the fluoro-boro compound is a tetrafluoroborate.

7. The fiber size composition according to claim 1, wherein:
   the fluoro-boro compound is a tetrafluoroborate selected from the group consisting of alkaline earth tetrafluoroborates, ammonium tetrafluoroborate and mixtures thereof.

8. The fiber size composition according to claim 7, wherein:
   the tetrafluoroborate is selected from the group consisting of potassium tetrafluoroborate, ammonium tetrafluoroborate and mixtures thereof.

9. The fiber size composition according to claim 8, wherein:
   the tetrafluoroborate is ammonium tetrafluoroborate.

10. The fiber size composition of claim 1 wherein:
    one of the two or more size enhancing compounds includes a boron compound selected from the group consisting of borohydrides, boron halides, boron nitride, organoboron compounds, borazoles, perborates, borosilicates, boric acid and mixtures thereof.

11. The fiber size composition of claim 10 wherein:
    the boron compound includes boric acid.

12. The fiber size composition of claim 1 wherein: the boron compound includes a tetraborate.

13. The fiber size composition of claim 12 wherein:
    the tetraborate is selected from the group consisting of dipotassium tetraborate, diammonium tetraborate and mixtures thereof.

14. The fiber size composition of claim 1, further comprising:
    a polyurethane.

15. A reinforcing fiber comprising:
    a mineral fiber; and
    a size composition layer formed on a majority of a surface area of the mineral fiber, wherein the size composition layer includes,
    1) a modified polyolefin;
    2) a hydrophilic coupling agent;
    3) two or more enhancers selected from the group consisting of
       a) one or more fatty acids selected from the group consisting of cyclic fatty acids and fatty dimer diacids;
       b) boron compounds;
       c) one or more fluorine compound selected from alkali metal fluorides, alkali metal tetrafluoroaluminates, alkali metal hexafluorozirconates and hexafluorosilicates;
       d) fluoro-boro compounds; and
       e) hydrophobic coupling agents; and
    4) S(VI) compounds alone or in combination with a member selected from the group consisting of P(III) compounds, P(V) compounds and a mixture of P(III) compounds and P(V) compounds.

16. The reinforcing fiber according to claim 15, wherein:
    one enhancer includes a hydrophobic silane coupling agent.

17. The reinforcing fiber according to claim 16, wherein:
    the hydrophobic silane coupling agent is selected from the group consisting of alkylsilanes, vinylsilanes and mixtures thereof.

18. A composite, fiber reinforced product comprising:
    a polymer matrix; and
    reinforcing fibers distributed throughout the polymer matrix, wherein the reinforcing fibers include a substantially complete layer of a size composition, and further wherein the size composition includes,
    1) a modified polyolefin;
    2) a hydrophilic coupling agent;
    3) two or more enhancers selected from the group consisting of
       a) one or more fatty acids selected from the group consisting of cyclic fatty acids and fatty dimer diacids;
       b) boron compounds;
       c) one or more fluorine compound selected from alkali metal fluorides, alkali metal tetrafluoroaluminates, alkali metal hexafluorozirconates and hexafluorosilicates;
       d) fluoro-boro compounds; and
       e) hydrophobic coupling agents; and
    4) an additive selected from sulfur(VI) compounds alone or in combination with a member selected from the group consisting of P(III) compounds, P(V) compounds and a mixture of P(III) compounds and P(V) compounds.

19. The composite, fiber reinforced product according to claim 18, wherein:
    one of the enhancers includes a hydrophobic silane coupling agent.

20. The reinforcing fiber according to claim 19, wherein:
the hydrophobic silane coupling agent is selected from the group consisting of alkylsilanes, vinylsilanes and mixtures thereof.

21. A fiber size composition comprising:
a modified polyolefin;
a hydrophilic coupling agent;
a compound selected from the group consisting of boron compounds and fluorine compounds and mixtures thereof;
a blend of at least two fatty acids, said blend including at least one saturated fatty acid having at least two fatty acid groups; and
an additive selected from S(VI) compounds alone or in combination with a member selected from the group consisting of P(III) compounds, P(V) compounds and a mixture of P(III) compounds and P(V) compounds.

22. The fiber size composition of claim 21, wherein:
the hydrophilic coupling agent includes one or more aminosilanes.

23. The fiber size composition of claim 21, wherein:
the fatty acids include a compound selected from the group consisting of $C_8$-$C_{40}$ alkyl chain fatty acids, lower alkyl acids and mixtures thereof.

24. The fiber size composition of claim 23, wherein:
the fatty acids include a lower alkyl acid selected from the group consisting of succinic acid, propionic acid and butyric acid.

25. The fiber size composition of claim 21, wherein:
the hydrophilic coupling agent includes an aminosilane; and
the additive includes both a P(III) compound and a P(V) compound, the P(III) and P(V) compounds being included at a molar ratio of from 1:1 to 10:1.

26. The fiber size composition of claim 21, wherein:
the hydrophilic coupling agent includes an aminosilane; and
the additive includes both a P(III) compound and a P(V) compound, the P(III) and P(V) compounds being included at a molar ratio of from 10:1 to 100:1.

27. The fiber size composition of claim 21, wherein:
the hydrophilic coupling agent includes an aminosilane; and
the additive includes a P(V) compound selected from the group consisting of aromatic alcohol phosphates, aromatic phosphoric acid esters, aromatic phosphoric acid ester salts, fatty alcohol phosphates and ethoxylated phosphates.

28. The fiber size composition of claim 21, wherein:
the hydrophilic coupling agent includes an aminosilane; and
the additive includes a S(VI) compound selected from the group consisting of sulfuric acid ($H_2SO_4$), $Al_2SO_4$, $NaHSO_4$, $(NH_4)HSO_4$, $(NH_4)_2SO_4$ and mixtures thereof.

* * * * *